United States Patent
Ogumi et al.

(10) Patent No.: US 10,295,706 B2
(45) Date of Patent: May 21, 2019

(54) OPTICAL FILM, POLARIZING PLATE, LIQUID CRYSTAL PANEL, AND IMAGE DISPLAY APPARATUS

(71) Applicant: DAI NIPPON PRINTING CO., LTD., Tokyo (JP)

(72) Inventors: Shoichiro Ogumi, Tokyo (JP); Junya Eguchi, Tokyo (JP); Gen Furui, Tokyo (JP); Seika Minakoshi, Tokyo (JP); Yukimitsu Iwata, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 14/396,882

(22) PCT Filed: Apr. 24, 2013

(86) PCT No.: PCT/JP2013/062053
§ 371 (c)(1),
(2) Date: Oct. 24, 2014

(87) PCT Pub. No.: WO2013/168569
PCT Pub. Date: Nov. 14, 2013

(65) Prior Publication Data
US 2015/0116835 A1    Apr. 30, 2015

(30) Foreign Application Priority Data

May 9, 2012   (JP) .................................. 2012-107676
May 16, 2012  (JP) .................................. 2012-112663

(51) Int. Cl.
*G02B 1/111*   (2015.01)
*G02B 5/02*    (2006.01)
(Continued)

(52) U.S. Cl.
CPC ............... *G02B 1/111* (2013.01); *G02B 1/14* (2015.01); *G02B 5/0221* (2013.01);
(Continued)

(58) Field of Classification Search
CPC . G02B 1/10–1/113; G02B 1/118; G02B 1/14; G02B 5/02–5/0247; G02B 5/0278;
(Continued)

(56) References Cited

U.S. PATENT DOCUMENTS 6,525,882 B1 *  2/2003  Yamamoto ............... G02B 5/08
                                                      359/507
2005/0152034 A1  7/2005  Matsunaga
(Continued)

FOREIGN PATENT DOCUMENTS

JP   10-68824 A1    3/1998
JP   2003-131007 A1 5/2003
(Continued)

OTHER PUBLICATIONS

International Search Report (Application No. PCT/JP2013/062053) dated May 28, 2013.
(Continued)

*Primary Examiner* — Kimberly N Kakalec
*Assistant Examiner* — James McGee
(74) *Attorney, Agent, or Firm* — Burr & Brown, PLLC

(57) ABSTRACT

Provided are: an optical film, wherein interference fringes can be suppressed from being generated, cloudiness is not observed, and a manufacture cost can be reduced. In accordance with one aspect of the present invention, there is provided an optical film 10 including a functional layer 12, wherein the functional layer 12 has a concavo-convex surface 12A; and in a state in which the concavo-convex surface 12A is irradiated with parallel light travelling in a direction sloped at 10° with respect to a normal direction N
(Continued)

of the optical film 10, in an angle distribution of reflected light intensities measured in a plane including both directions of the normal direction N and the travelling direction T of the parallel light, a value obtained by subtracting ½ angle width from 1/100 angle width is 0.7° or more and 1.4° or less.

22 Claims, 9 Drawing Sheets

(51) Int. Cl.
  *G02F 1/1335* (2006.01)
  *G02B 1/14* (2015.01)
  *G02B 5/30* (2006.01)
(52) U.S. Cl.
  CPC ......... *G02B 5/0242* (2013.01); *G02B 5/0278* (2013.01); *G02B 5/0294* (2013.01); *G02B 5/3033* (2013.01); *G02F 1/133502* (2013.01); *G02F 1/133528* (2013.01); *G02F 2201/38* (2013.01)
(58) Field of Classification Search
  CPC ............. G02B 5/0294; G02F 1/133502; G02F 1/133528; G02F 2201/38
  USPC ....... 359/580–581, 586, 599, 601, 613, 614, 359/707; 349/112, 137; 348/834; 362/606–607, 617–620; 977/773–777, 977/778, 782
  See application file for complete search history.

(56) References Cited

U.S. PATENT DOCUMENTS

| | | | |
|---|---|---|---|
| 2006/0269733 A1 | 11/2006 | Mizuno et al. | |
| 2007/0104896 A1 | 5/2007 | Matsunaga et al. | |
| 2007/0201907 A1* | 8/2007 | Baba | G03G 15/0812 399/274 |
| 2008/0213513 A1* | 9/2008 | Kameshima | G02B 5/0226 428/1.32 |
| 2008/0286527 A1* | 11/2008 | Haga | G02B 5/0221 428/143 |
| 2009/0310219 A1* | 12/2009 | Nagahama | G02B 1/118 359/488.01 |
| 2010/0283945 A1 | 11/2010 | Kodama et al. | |
| 2011/0003121 A1* | 1/2011 | Tsuda | G02B 1/118 428/156 |
| 2011/0194055 A1 | 8/2011 | Kodama et al. | |
| 2012/0141736 A1* | 6/2012 | Hotta | C09D 7/125 428/143 |
| 2013/0250414 A1 | 9/2013 | Eguchi et al. | |

FOREIGN PATENT DOCUMENTS

| | | |
|---|---|---|
| JP | 2003-248101 A1 | 9/2003 |
| JP | 2005-099778 A1 | 4/2005 |
| JP | 2006-106290 A1 | 4/2006 |
| JP | 2007-072735 A1 | 3/2007 |
| JP | 2007-219485 A1 | 8/2007 |
| JP | 2007-233320 A1 | 9/2007 |
| JP | 2009-265143 A1 | 11/2009 |
| JP | 2011-081118 A1 | 4/2011 |
| JP | 2011-141357 A1 | 7/2011 |
| JP | 2011-221491 A1 | 11/2011 |
| KR | 10-2011-0084410 A | 7/2011 |
| WO | 2010/047298 A1 | 4/2010 |
| WO | 2012/053632 A1 | 4/2012 |

OTHER PUBLICATIONS

International Preliminary Report on Patentability (Application No. PCT/JP2013/062053) dated Nov. 20, 2014.
Chinese Office Action (Application No. 201380019720.6) dated May 19, 2015 (with English translation).
Korean Office Action (Application No. 10-2014-7024917) dated Jun. 15, 2015 (with English translation).
Decision of Rejection (With English Translation), Japanese Application No. 2014-514668, dated Aug. 7, 2015 (7 pages).
Japanese Office Action (Application No. 2014-514668) dated Jun. 5, 2015 (with English translation).
Japanese Office Action (Application No. 2015-142256) dated May 13, 2016 (with English translation).

* cited by examiner

OPTICAL FILM, POLARIZING PLATE, LIQUID CRYSTAL PANEL, AND IMAGE DISPLAY APPARATUS

BACKGROUND OF THE INVENTION

1. Field of the Invention

The present invention relates to optical films, polarizing plates, liquid crystal panels, and image display apparatuses.

2. Description of Related Art

An antireflection film having an antireflection layer on an outermost surface thereof or an antiglare film having concavities and convexities on an outermost surface thereof, for suppressing glare from extraneous light, is generally disposed on an image display surface in an image display apparatus such as a liquid crystal display (LCD), a cathode ray tube display (CRT), a plasma display (PDP), an electroluminescence display (ELD), or a field emission display (FED).

An antireflection film mainly includes a light transmissive base material; a hard coat layer disposed on the light transmissive base material; and a low refractive index layer, as an antireflection layer, disposed on the hard coat layer. The antireflection film reduces reflected light in itself by countering light reflected on a surface of the low refractive index layer and light reflected on an interface between the low refractive index layer and the hard coat layer with each other.

However, such an antireflection film has a problem that a rainbow-colored uneven pattern called an interference fringe is generated by interference of light reflected on an interface between a light transmissive base material and a hard coat layer and light reflected on an interface between a low refractive index layer and the hard coat layer due to a difference between the refractive indices of the light transmissive base material and the hard coat layer.

Against such a problem, there has been developed a technology, in which, when a hard coat layer is formed on a light transmissive base material, the upper part of the light transmissive base material is permeated by the constituent of a composition for a hard coat layer, a mixture region, in which the constituent of the light transmissive base material and the constituent of the hard coat layer are mixed, is formed in the vicinity of an interface between the light transmissive base material and the hard coat layer, and a difference between the refractive indices of the light transmissive base material and the hard coat layer is reduced by the mixture region to allow prevention of generation of interference fringes (e.g., see Japanese Patent Laid-Open No. 2003-131007).

However, since the surface of the hard coat layer is flat in the antireflection film, the prevention of the generation of the interference fringes requires the formation of the mixture region having a sufficient thickness. Further, when the mixture region having a sufficient thickness is formed, desired hardness may not be obtained in the antireflection film if the thickness of the hard coat layer on the mixture region is not increased, since the mixture region is comparatively soft. Thus, there is a problem that it is necessary to thickly apply the composition for a hard coat layer on the light transmissive base material, so that a manufacture cost becomes high.

On the other hand, an antiglare film includes a light transmissive base material; and an antiglare hard coat layer that is disposed on the light transmissive base material and has concavities and convexities on a surface thereof (e.g., see Japanese Patent Laid-Open No. 2011-81118). According to the antiglare film, extraneous light can be diffusely reflected by the concavities and convexities on the surface of the antiglare hard coat layer.

In the antiglare film, since interference fringes can be made to be invisible by the concavities and convexities on the surface of the antiglare hard coat layer, the thickness of a mixture region or the thickness of the antiglare hard coat layer can be made to be smaller than that of the mixture region or hard coat layer of the antireflection film.

Currently, the need for an optical film having surface glossiness, such as the antireflection film, has been increased. However, the antireflection film has the problem that the manufacture cost thereof is high as described above. Further, the antiglare film has cloudiness since such concavities and convexities that antiglare properties are obtained are formed on the surface thereof. Therefore, surface glossiness is not obtained, so that the antiglare film has not been currently a substitute for the antireflection film.

SUMMARY OF THE INVENTION

Technical Problem

The present invention was accomplished to solve the above-described problems. That is, the present invention is aimed at providing an optical film, a polarizing plate, a liquid crystal panel, and an image display apparatus, wherein interference fringes can be suppressed from being generated, cloudiness is not observed, and a manufacture cost can be reduced.

Solution to Problem

In accordance with one aspect of the present invention, there is provided an optical film including a light transmissive base material; and a functional layer disposed on the light transmissive base material, wherein the functional layer has a concavo-convex surface forming a surface of the optical film; and in a state in which the concavo-convex surface of the functional layer is irradiated with parallel light travelling in a direction sloped at 10° with respect to a normal direction of the optical film, in an angle distribution of a reflected light intensity measured in a plane including both directions of the normal direction and the travelling direction of the parallel light, a value obtained by subtracting a width of an angle region, in which a reflected light intensity that is not less than ½ of a maximum reflected light intensity is measured, from a width of an angle region, in which a reflected light intensity that is not less than ¹⁄₁₀₀ of the maximum reflected light intensity is measured, is 0.7° or more and 1.4° or less.

In accordance with another aspect of the present invention, there is provided an optical film including a light transmissive base material; and a functional layer disposed on the light transmissive base material, wherein the functional layer has a concavo-convex surface forming a surface of the optical film; and a reflection clarity of the concavo-convex surface, measured using a 0.5 mm-width optical comb, is 90% or less, and a reflection clarity of the concavo-convex surface, measured using a 2.0 mm-width optical comb, is 80% or more.

In accordance with another aspect of the present invention, there is provided a polarizing plate including the optical film described above; and a polarizing element formed on a surface opposite to a surface, on which the functional layer is formed, of the light transmissive base material of the optical film.

In accordance with another aspect of the present invention, there is provided a liquid-crystal display panel including the optical film described above or the polarizing plate described above.

In accordance with another aspect of the present invention, there is provided an image display apparatus including the optical film described above or the polarizing plate described above.

Advantageous Effects of Invention

In the optical film according to one aspect of the present invention and the polarizing plate, the liquid crystal panel, and the image display apparatus according to other aspects, in a state in which the concavo-convex surface of the functional layer is irradiated with parallel light travelling in a direction sloped at 10° with respect to a normal direction of the optical film, in an angle distribution of a reflected light intensity measured in a plane including both directions of the normal direction and the travelling direction of the parallel light, a value obtained by subtracting a width of an angle region, in which a reflected light intensity that is not less than ½ of a maximum reflected light intensity is measured, from a width of an angle region, in which a reflected light intensity that is not less than 1/100 of the maximum reflected light intensity is measured, is 0.7° or more and 1.4° or less, and therefore, interference fringes can be suppressed from being generated, cloudiness is not observed, and a manufacture cost can be reduced.

In the optical film according to another aspect of the present invention and the polarizing plate, the liquid crystal panel, and the image display apparatus according to other aspects, a reflection clarity of the concavo-convex surface, measured using a 0.5 mm-width optical comb, is 90% or less, while a reflection clarity of the concavo-convex surface, measured using a 2.0 mm-width optical comb, is 80% or more, and therefore, interference fringes can be suppressed from being generated, cloudiness is not observed, and a manufacture cost can be reduced.

DETAILED DESCRIPTION OF THE INVENTION

First Embodiment

Figure 1:
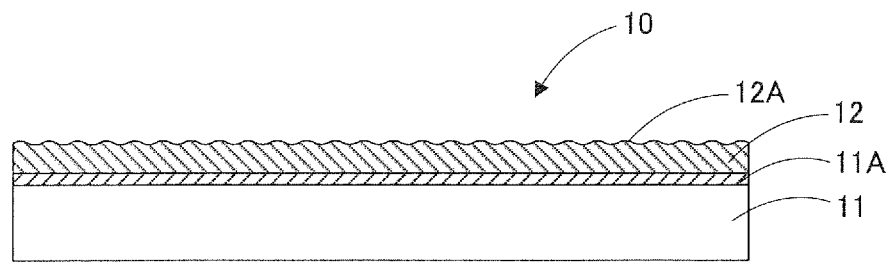
FIG. 1 is a schematic view illustrating the configuration of an optical film according to a first embodiment.
Figure 2:
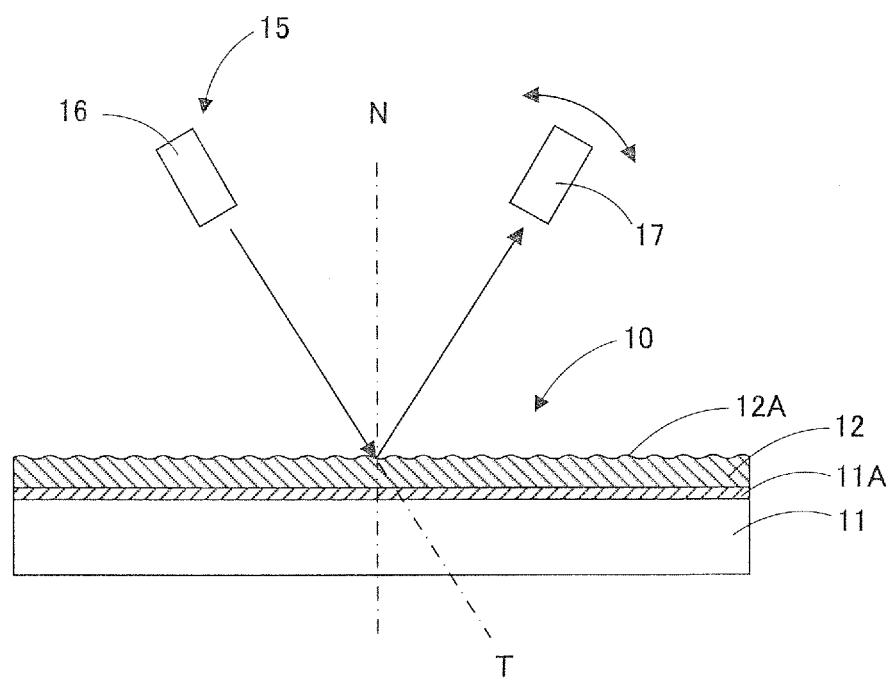
FIG. 2 is a schematic view illustrating a state in which the angle distribution of reflected light intensities in the optical film according to the first embodiment is measured with a variable angle photometer.

An optical film according to the first embodiment of the present invention will be described below with reference to the drawings. FIG. 1 is a schematic view illustrating the configuration of the optical film according to the present embodiment; and FIG. 2 is a schematic view illustrating a state in which the angle distribution of reflected light intensities in the optical film according to the present embodiment is measured with a variable angle photometer.

<<Optical Film>>

As illustrated in FIG. 1, the optical film 10 includes at least a light transmissive base material 11 and a functional layer 12 disposed on the light transmissive base material 11. It is preferable to form a mixture region 11A, in which the light transmissive base material 11 is mixed with a resin containing as a monomer unit a photopolymerizable monomer having a weight average molecular weight of 1000 or less in the vicinity of the interface between the light transmissive base material 11 and the functional layer 12, as illustrated in FIG. 1. As used herein, the terms "sheet", "film", "plate", and the like are based only on differences in names and not distinguished from each other. Thus, for example, "sheet" is a concept encompassing a member that can also be called a film or a plate. As one specific example, "optical film" also encompasses a member called "optical sheet", "optical plate", or the like. In addition, "weight average molecular weight" is a value obtained by dissolution in a solvent such as THF, and by polystyrene conversion by a gel permeation chromatography (GPC) method known in the art.

<Light Transmissive Base Material>

The light transmissive base material 11 is not particularly limited as long as the base material has light transmissiveness but examples thereof include cellulose acylate base materials, cycloolefin polymer base materials, polycarbonate base materials, acrylate-based polymer base materials, polyester base materials, or glass base materials.

Examples of the cellulose acylate base materials include cellulose triacetate base materials and cellulose diacetate base materials. Examples of the cycloolefin polymer base materials include base materials including polymers of norbornene-based monomers, monocyclic cycloolefin monomers, and the like.

Examples of the polycarbonate base materials include aromatic polycarbonate base materials based on bisphenols (such as bisphenol A) and aliphatic polycarbonate base materials based on diethylene glycol bis(allyl carbonate) and the like.

Examples of the acrylate-based polymer base materials include poly(methyl (meth)acrylate) base materials, poly(ethyl (meth)acrylate) base materials, methyl (meth)acrylate-butyl (meth)acrylate copolymer base materials, and the like.

Examples of the polyester base materials include a base material containing as a constituent at least one of polyethylene terephthalate, polypropylene terephthalate, polybutylene terephthalate, and polyethylene naphthalate; and the like.

Examples of the glass base materials include glass base materials based on soda lime silica glass, borosilicate glass, alkali-free glass, and the like.

The cellulose acylate base materials are preferred among them because of having excellent retardation and being easily adhered to polarizers, and triacetylcellulose base materials (TAC base materials) are further preferred among the cellulose acylate base materials. Such a triacetylcellulose base material is a light transmissive base material that can have an average light transmittance of 50% or more in a visible light region of 380 to 780 nm. The triacetylcellulose base material preferably has an average light transmittance of 70% or more, further preferably 85% or more.

The triacetylcellulose base material may also be a substance, in which a constituent other than acetic acid is also combined as a fatty acid with which cellulose is esterified, such as cellulose acetate propionate or cellulose acetate butyrate, other than pure triacetylcellulose. Further, other cellulose lower fatty acid esters such as diacetyl cellulose or various additives such as plasticizers, ultraviolet absorbing agents, and lubricants may also be optionally added to such triacetylcelluloses.

The cycloolefin polymer base materials are preferred in view of excellent retardation and heat resistance, and the polyester base materials are preferred in view of mechanical characteristics and heat resistance.

The thickness of the light transmissive base material 11 is not particularly limited but can be 5 μm or more and 1000 μm or less. The lower limit of the thickness of the light transmissive base material 11 is preferably 15 μm or more, more preferably 25 μm or more, from the viewpoint of handleability and the like. The upper limit of the thickness of the light transmissive base material 11 is preferably 80 μm or less from the viewpoint of thinning.

<Mixture Region>

The mixture region 11A is a region, in which the light transmissive base material 1 is mixed with a resin containing as a monomer unit a photopolymerizable monomer having a weight average molecular weight of 1000 or less, as mentioned above. The photopolymerizable monomer is the same as a photopolymerizable monomer having a weight average molecular weight of 1000 or less contained as a monomer unit in the binder resin of the functional layer 12.

The thickness of the mixture region 11A is preferably 0.01 μm or more and 1 μm or less. In accordance with this embodiment, interference fringes can be sufficiently suppressed from being generated by the concavo-convex surface 12A, described below, of the functional layer 12. Therefore, interference fringes can be suppressed from being generated even when the thickness of the mixture region 11A is small in such a case. Since the thickness of a mixture region formed with a conventional antireflection film is 3 μm or more, the thickness of the mixture region 11A may be considered to be sufficiently small in comparison with that of the mixture region formed with the conventional antireflection film. Further, the formation of the mixture region 11A can cause adhesiveness between the light transmissive base material 11 and the functional layer 12 to be more improved. Since interference fringes can be sufficiently suppressed from being generated by the concavo-convex surface 12A of the functional layer 12 as described above, it is not necessary to form such a mixture region 11A in the optical film 10. Since interference fringes can be suppressed from being generated even when any mixture region is not formed as described above, for example, even a base material, on which it is difficult to form a mixture region, such as an acrylic base material, a cycloolefin polymer base material, or a polyester base material, may be used as the light transmissive base material.

<Functional Layer>

A functional layer is a layer intended to exert any function in an optical film and specific examples thereof include layers that exert a function such as a hard coat property, an antireflection property, an antistatic property, or an antifouling property. The functional layer may be not only a single layer but also a layer in which two or more layers are laminated. The functional layer 12 according to the present embodiment functions as a hard coat layer. As used herein, "hard coat layer" refers to a layer for improving the scratch resistance of an optical film and specifically means a layer having a hardness of "H" or more on the pencil hardness test (load of 4.9 N) defined in JIS K5600-5-4 (1999). The functional layer 12 according to the present embodiment is a single layer and functions as a hard coat layer but, for example, a functional layer may also be configured by a hard coat layer and another functional layer disposed between the hard coat layer and a light transmissive base material. In this case, a surface of an optical film (concavo-convex surface of the functional layer) is a surface of the hard coat layer. Further, a functional layer may also be configured by a first hard coat layer having concavities and convexities on its surface and a second hard coat layer that is disposed on the first hard coat layer and is for adjusting the concavities and convexities on the surface of the first hard coat layer or may also be configured by a hard coat layer having concavities and convexities on its surface and a low refractive index layer that is disposed on the hard coat layer and has a lower refractive index than that of the hard coat layer as described in the second embodiment. In this case, a surface of an optical film (concavo-convex surface of the functional layer) is a surface of the second hard coat layer or the low refractive index layer.

The functional layer 12 has the concavo-convex surface 12A, which forms a surface of the optical film 10. In the optical film 10, as illustrated in FIG. 2, in a state in which the concavo-convex surface 12A of the functional layer 12 is irradiated with parallel light travelling in a direction sloped at 10° with respect to a normal direction N of the optical film 10, in an angle distribution of reflected light intensities measured in a plane including both directions of the normal direction N and the travelling direction T of the parallel light, a value obtained by subtracting a width of an angle region, in which a reflected light intensity that is not less than ½ of a maximum reflected light intensity is measured, from a width of an angle region, in which a reflected light intensity that is not less than 1/100 of the maximum reflected light intensity is measured, is 0.7° or more and 1.4° or less (hereinafter, "width of angle region in which reflected light intensity that is not less than $1/100$ of maximum reflected light intensity is measured" is referred to as "$1/100$ angle width", and "width of angle region in which reflected light intensity that is not less than ½ of maximum reflected light intensity is measured" is referred to as "½ angle width"). The expression "normal direction of optical film" refers to a direction normal to a plane corresponding to the planer direction of an optical film of interest which is viewed as a whole and in perspective. Further, the expression "plane including both directions of normal direction and travelling direction of parallel light" is interpreted to include an error without being restricted by strict meanings. The expression "$1/100$ angle width" means an angle width between a first angle, at which the reflected light intensity of $1/100$ of a maximum reflected light intensity is measured, and a second angle, at which the reflected light intensity of $1/100$ of the maximum reflected light intensity is measured. Similarly, the expression "½ angle width" means an angle width between a first angle, at which the reflected light intensity of ½ of the maximum reflected light intensity is measured, and a second angle at which the reflected light intensity of ½ of the maximum reflected light intensity is measured. The reflected light intensity of $1/100$ or the reflected light intensity of ½ includes an interpolated (linearly interpolated) value.

The lower limit of the value obtained by subtracting the ½ angle width from the $1/100$ angle width is preferably 0.8° or more, more preferably 0.9° or more. Further, the upper limit of the value obtained by subtracting the ½ angle width from the $1/100$ angle width is preferably 1.3° or less, more preferably 1.2° or less.

The angle distribution of reflected light intensities can be measured with a known variable angle photometer (goniophotometer). As illustrated in FIG. 2, a variable angle photometer 15 includes a light source 16 which performs irradiation with parallel light; and a detector 17, in which irradiation of parallel light from the light source 16 is performed from a direction sloped at 10° with respect to the normal direction N of the optical film 10 toward the concavo-convex surface 12A of the functional layer 12, and a reflected light intensity is measured every 0.1° with the detector 17, while continuously varying the measurement angle of the detector 17, in a plane including both directions of the normal direction N and the travelling direction T of parallel light, whereby the angle distribution of the reflected light intensities of reflected light from the concavo-convex surface 12A can be obtained. Such variable angle photometers include a variable angle photometer GP-200 manufactured by MURAKAMI COLOR RESEARCH LABORATORY, and the like.

The reason of the definition by a value obtained by subtracting the ½ angle width from the $1/100$ angle width in the present invention is as follows. There is a tendency that when irradiation with parallel light from a direction sloped at 10° with respect to the normal direction of the film plane of the optical film toward the concavo-convex surface of the functional layer is performed to measure the angle distribution of reflected light intensities, a reflected light intensity at around a regular reflection direction (0°) is the highest, a reflected light intensity is sharply decreased from the regular reflection direction to a certain angle, and a reflected light intensity is gently decreased at angles that are larger than the certain angle, not only in the optical film of the present invention but also in a conventional antireflection film and a conventional antiglare film. As a result of extensive examination, the present inventor found by experiment that the degree of $1/100$ angle width particularly affects interference fringes and cloudiness when the angle distribution of reflected light intensities exhibits such a tendency as described above. Specifically, the diffusibility of the reflected light is increased with increasing the $1/100$ angle width. When the diffusibility of reflected light is high, interference fringes can be suppressed from being generated because the light color-mixed with rainbow colors generated by interference arrives at an observer and, therefore, is not recognized as the interference fringes, while there is a fear that the amount of the reflected light reaching the human eye is increased, and therefore, the light is recognized as cloudiness. When this point was extensively examined by the present inventor, it was found that when a $1/100$ angle width is an adequate width on a surface of the optical film, interference fringes can be suppressed from being generated, and generation of cloudiness is not recognized, equivalent to regular reflection, by the detection capability of the human eye. However, when the angle distribution of reflected light intensities is measured to determine a $1/100$ angle width, the incidence of light, reflected on the optical film, on a detector is precluded to greatly vary a measured value (reflected light intensity) even if the installation angle of the optical film to be measured is little (e.g., 0.1°) deviated. Thus, stable measurement has not been enabled only by simply measuring the angle distribution of reflected light intensities with a variable angle photometer. Thus, the present inventor attempted to widen the light receiving diaphragm of a detector. In this measurement technique, a measured value is not greatly varied to enable stable measurement even if the installation angle of the optical film is deviated to some extent since the area of reflected light incident on the detector is increased. However, a measured angle width is increased according to the size of the light receiving diaphragm when the light receiving diaphragm of the detector is widened. Thus, the present inventor found that measurement is performed in a state in which the light receiving diaphragm of a detector is widened and that a ½ angle width is subtracted from a $1/100$ angle width in the angle distribution of obtained reflected light intensities. In such a measurement technique, stable measurement is enabled since the light receiving diaphragm is widened. Even if a measured angle width is increased by widening the light receiving diaphragm, an increment of the increased angle width by widening the light receiving diaphragm can be offset by subtracting a ½ angle width from a $1/100$ angle width. Further, since the ½ angle widths of the optical film of the present invention, the conventional antireflection film, and the conventional antiglare film are similar, a value obtained by subtracting a ½ angle width from a $1/100$ angle width substantially indicates the evaluation of the $1/100$ angle width. By such reasons as described above, the definition by a value obtained by subtracting a ½ angle width from a $1/100$ angle width is made in the present invention.

The reason that a value obtained by subtracting a ½ angle width from a $1/100$ angle width is defined as 0.7° or more and 1.4° or less in the present invention is because generated interference fringes can be suppressed and generation of cloudiness is not recognized by the detection capability of the human eye by the above-mentioned reason if the value obtained by subtracting the ½ angle width from the $1/100$ angle width is in the range.

In the concavo-convex surface 12A of the functional layer 12, assuming that, in a cross section along the normal direction N of a film plane of the optical film 10, the slope angle of the concavo-convex surface 12A with respect to the film plane is a surface angle, the rate of a region in which the surface angle is 0.05° or more is preferably 50% or more. The rate of the region in which the surface angle is 0.05° or more is allowed to be 50% or more, whereby interference fringes can be more suppressed from being generated. The lower limit of the rate of the region in which the surface angle is 0.05° or more is preferably 55% or more, more preferably 60% or more. Further, the upper limit of the rate of the region in which the surface angle is 0.05° or more is preferably 95% or less, more preferably 90% or less.

A surface angle is obtained by measuring the surface shape of the concavo-convex surface 12A of the functional layer 12. Examples of surface shape measuring apparatuses include contact-type surface roughness measuring instruments and non-contact-type surface roughness measuring instruments (e.g., interference microscopes, confocal microscopes, and atomic force microscopes, and the like). Among them, an interference microscope is preferred in view of simpleness of measurement. Examples of such interference microscopes include "New View" series, manufactured by Zygo Corporation; and the like.

In order to calculate the rate of a region with a surface angle of 0.05° or more using an interference microscope, for example, a slope Δi at each point is determined over the whole concavo-convex surface, the slope Δi is converted into a surface angle θi from the following expression (1), and the rate of a region in which the absolute value of the surface angle θi is 0.05° or more is thus calculated. The slope Δi can be determined from the following expression (3) because of being the same as a local slope $dZ_i/dX_i$ calculated from the following expression (3).

$$\theta i = \tan^{-1} \Delta i \quad (1)$$

The root mean square slope RΔq of a roughness curve is preferably 0.003 or less on the concavo-convex surface 12A of the functional layer 12. The root mean square slope RΔq of a roughness curve is allowed to be 0.003 or less, whereby cloudiness can be more reduced to enable an optical film having surface glossiness to be obtained. The lower limit of RΔq is preferably 0.0005 or more, more preferably 0.001 or more. Further, the upper limit of RΔq is preferably 0.0025 or less, more preferably 0.002 or less.

The root mean square slope RΔq of a roughness curve is defined as a root mean square of a local area slope $dZ_i/dX_i$ in JIS-B0601: 2001 and is represented by the following expression (2):

[Expression 1]

$$R\Delta q = \sqrt{\frac{1}{n}\sum_{i}^{n}\left(\frac{dZ_i}{dX_i}\right)^2} \quad (2)$$

In the expression, n is the total number of measurement points; and $dZ_i/dX_i$ is an i-th local area slope. A local area slope at each point on a measurement plane is determined from, e.g., the following expression (3).

[Expression 2]

$$\frac{dZ_i}{dX_i} = \frac{Z_{i+1} - Z_{i-1}}{2\Delta X} \quad (3)$$

In the expression, assuming that one direction of a measurement plane is an X-direction, $X_i$ is a position in the i-th X-direction, $Z_i$ is the i-th height, and ΔX is a sampling interval.

A root mean square slope RΔq is obtained by measuring the surface shape of the concavo-convex surface 12A in the same manner as in the case of the surface angle. Examples of surface shape measuring apparatuses include contact-type surface roughness measuring instruments and non-contact-type surface roughness measuring instruments (e.g., interference microscopes, confocal microscopes, and atomic force microscopes, and the like). Among them, an interference microscope is preferred in view of simpleness of measurement. Examples of such interference microscopes include "New View" series, manufactured by Zygo Corporation; and the like.

In the concavo-convex surface 12A of the functional layer 12, the average spacing Sm of the concavities and convexities that constitute the concavo-convex surface 12A is preferably 0.20 mm or more and 0.60 mm or less, more preferably 0.22 mm or more and 0.50 mm or less. In the concavo-convex surface 12A of the functional layer 12, the average slope angle θa of the concavities and convexities that constitute the concavo-convex surface 12A is preferably 0.01° or more and 0.1° or less, more preferably 0.04° or more and 0.08° or less.

In the concavo-convex surface 12A of the functional layer 12, the arithmetic mean roughness Ra of the concavities and convexities that constitute the concavo-convex surface 12A is preferably 0.02 μm or more and 0.10 μm or less, more preferably 0.04 μm or more and 0.08 μm or less. In the concavo-convex surface 12A of the functional layer 12, the maximum height roughness Ry of the concavities and convexities that constitute the concavo-convex surface 12A is preferably 0.20 μm or more and 0.60 μm or less, more preferably 0.25 μm or more and 0.40 μm or less. In the concavo-convex surface 12A of the functional layer 12, the ten-point average roughness Rz of the concavities and convexities that constitute the concavo-convex surface 12A is preferably 0.15 μm or more and 0.50 μm or less, more preferably 0.18 μm or more and 0.30 μm or less.

The definitions of "Sm", "Ra", "Ry", and "Rz" described above should comply with JIS B0601-1994. The definition of "θa" should comply with the instruction manual (revised on Jul. 20, 1995) of a surface roughness measuring instrument: SE-3400, manufactured by Kosaka Laboratory Ltd. Specifically, θa is represented by the following expression (4):

$$\theta a = \tan^{-1} \Delta a \quad (4)$$

In the expression, Δa is a slope represented in an aspect ratio and a value obtained by dividing the total sum of differences between the minimum portions and the maximum portions of respective concavities and convexities (equivalent to the heights of the respective convexities) by a reference length.

Sm, θa, Ra, Ry, and Rz can be measured, for example, using a surface roughness measuring instrument (model number: SE-3400, manufactured by Kosaka Laboratory Ltd.) under the following measurement conditions:

1) Tracer in Surface Roughness Detector (trade name: SE2555N (standard 2 μm), manufactured by Kosaka Laboratory Ltd.)

Radius of curvature in tip: 2 μm, apex angle: 90 degrees, material: diamond

2) Measurement Conditions for Surface Roughness Measuring Instrument

Reference length (cutoff value λc of roughness curve): 2.5 mm

Evaluation length (reference length (cutoff value λc)×5): 12.5 mm

Feed speed of tracer: 0.5 mm/sec

Preliminary length: (cutoff value λc)×2

Longitudinal magnification: 2000 times

Lateral magnification: 10 times

When the functional layer 12 is a hard coat layer as described in accordance with the present embodiment, the hard coat layer preferably has a thickness of 2.0 µm or more and 7.0 µm or less. When the thickness of the hard coat layer is within this range, desired hardness can be obtained. Further, while the hard coat layer can be thinned, the occurrence of cracking or curl of the hard coat layer can be suppressed. The thickness of the hard coat layer can be measured by microscopic observation of its cross section. The lower limit of the thickness of the hard coat layer is more preferably 3 µm or more and the upper limit thereof is more preferably 5 µm or less.

In the present invention, interference fringes can be suppressed from being generated, cloudiness is not observed, and a manufacture cost can be reduced in the optical film, if in a state in which the concavo-convex surface of the functional layer is irradiated with parallel light travelling in a direction sloped at 10° with respect to a normal direction of the optical film, in the angle distribution of reflected light intensities measured in a plane including both directions of the normal direction and the travelling direction of the parallel light, a value obtained by subtracting a ½ angle width from a 1/100 angle width is 0.7° or more and 1.4° or less. Thus, a material that constitutes the functional layer is not particularly limited as long as the material is appropriately selected so that this requirement is satisfied. Hereinafter, the angle distribution of reflected light intensities in which a value obtained by subtracting a ½ angle width from a 1/100 angle width is 0.7° or more and 1.4° or less is referred to as "specific angle distribution of reflected light intensities".

The specific angle distribution of reflected light intensities can be obtained by adjusting the sizes of concavities and convexities present on the concavo-convex surface of the functional layer. The functional layer 12 having the concavo-convex surface in which the specific angle distribution of reflected light intensities is obtained can be formed by, for example, (1) a method of applying a resin composition for a functional layer, containing fine particles and a photopolymerizable compound to be a binder resin after polymerization, to a light transmissive base material; (2) a method of applying a composition for a functional layer to a light transmissive base material and then die-pressing a die, of which the surface has a groove with a shape reverse to the concavo-convex surface, to the composition for a functional layer; (3) a method of applying a resin composition for a functional layer, in which disklike particles of which the surfaces has a shape of concavities and convexities corresponding to the above-described concavo-convex surface in which the specific angle distribution of reflected light intensities is obtained are dispersed, to a transparent base material to arrange the disklike particles on the surface of the functional layer; or the like. Among them, the method (1) is preferred since production is easy.

In the above-described method (1), when the photopolymerizable compound is polymerized (crosslinked) to become the binder resin, shrinkage as a whole occurs since the photopolymerizable compound effects shrinkage on curing in a portion in which any fine particles are not present. In contrast, only the photopolymerizable compound existing above or below the fine particles effects shrinkage on curing since the fine particles do not effect shrinkage on curing in a portion in which the fine particles are present. As a result, the film thickness of the functional layer in the portion in which the fine particles are present is larger than that in the portion in which any fine particles are not present and, therefore, the surface of the functional layer has a concavo-convex shape. Thus, the functional layer 12 having the concavo-convex surface 12A in which the specific angle distribution of reflected light intensities is obtained can be formed by appropriately selecting the kind and particle diameters of the fine particles and the kind of the photopolymerizable compound to adjust film formation conditions.

An example in which a functional layer 12 as a hard coat layer contains fine particles and a binder resin will be described below. For example, such a functional layer 12 containing fine particles and a binder resin can be formed by the above-described method (1).

(Fine Particles)

Although the fine particles may be inorganic fine particles or organic fine particles, among them, the inorganic oxide fine particles such as silica ($SiO_2$) fine particles, alumina fine particles, titanic fine particles, tin oxide fine particles, antimony-dope tin oxide (abbreviated name: ATO) fine particles, and zinc oxide fine particles are preferred. The inorganic oxide fine particles can form aggregates in the functional layer, and a concavo-convex surface 12A in which the specific angle distribution of reflected light intensities is obtained can be formed depending on the degree of the aggregation of the aggregates.

Examples of the organic fine particles may include plastic beads. Specific examples of the plastic beads include polystyrene beads, melamine resin beads, acrylic beads, acryl-styrene beads, silicone beads, benzoguanamine beads, benzoguanamine-formaldehyde condensate beads, polycarbonate beads, polyethylene beads, and the like.

In the above-mentioned shrinkage on curing, the organic fine particles preferably have the moderately adjusted resistance to the shrinkage on curing, of the fine particles. In order to adjust the resistance to the shrinkage, it is preferable to previously make a plurality of optical films containing organic fine particles made to have the varying degrees of three-dimensional crosslinking and having different hardnesses and to evaluate the angle distribution of reflected light intensities on the concavo-convex surface of the optical film, to thereby select the degree of crosslinking suitable for a concavo-convex surface in which the specific angle distribution of reflected light intensities is obtained.

In order to use inorganic oxide particles as fine particles, the inorganic oxide particles are preferably subjected to surface treatment. By subjecting the inorganic oxide fine particles to the surface treatment, distribution of the fine particles in a functional layer 12 can be preferably controlled and the chemical resistance and saponification resistance of the fine particles in themselves can also be improved.

As the surface treatment, hydrophobization treatment in which the surfaces of fine particles are imparted with hydrophobicity is preferable. Such hydrophobization treatment can be obtained by chemically reacting the surfaces of fine particles with a surface treatment agent such as a silane or a silazane. Specific examples of the surface treatment agent include dimethyldichlorosilane, silicone oil, hexamethyldisilazane, octylsilane, hexadecylsilane, aminosilane, methacrylsilane, octamethylcyclotetrasiloxane, polydimethylsiloxane, and the like. When the fine particles are inorganic oxide fine particles, hydroxyl groups are present on the surface of the inorganic oxide fine particles. Such hydrophobization treatment as described above results in reduction in the number of hydroxyl groups present on the surfaces of the inorganic oxide fine particles and in the specific surface area of the inorganic oxide fine particles, measured by the BET method, as well as can result in suppression of excessive aggregation of the inorganic oxide fine particles and in formation of a functional layer having a concavo-convex surface in which the specific angle distribution of reflected light intensities is obtained.

When inorganic oxide particles are used as the fine particle, the inorganic oxide fine particles are preferably amorphous. This is because, when the inorganic oxide particles are crystalline, a Lewis acid salt of the inorganic oxide fine particles becomes stronger due to lattice defects contained in the crystal structure thereof and the excessive aggregation of the inorganic oxide fine particles might not be controlled.

When inorganic oxide particles are used as the fine particles, the inorganic oxide fine particles preferably form aggregates in the functional layer 12. The aggregates of the inorganic oxide fine particles preferably have a structure, in which the inorganic oxide fine particles are not massive but are three-dimensionally linked, in the functional layer 12. Examples of the structure in which the inorganic oxide fine particles are not massive but are three-dimensionally linked include basket-shaped and coiled structures. That is, the aggregates having the structure in which the inorganic oxide fine particles are not massive but are three-dimensionally linked are easily and homogeneously deformed during shrinkage on curing of a photopolymerizable compound to be a binder resin after curing. As a result, a concavo-convex surface can be made to be a very smooth surface, and the concavo-convex surface does not therefore have a steep slope to allow formation of a functional layer having a concavo-convex surface in which the specific angle distribution of reflected light intensities is obtained. As mentioned above, a functional layer having a concavo-convex surface in which the specific angle distribution of reflected light intensities is obtained can be formed by moderately adjusting the degree of crosslinking even when an organic resin is used.

The content of fine particles with respect to the functional layer 12 is not particularly limited but is preferably 0.1 mass % or more and 5.0 mass % or less. Since the content of the fine particles is 0.1 mass % or more, a concavo-convex surface in which the specific angle distribution of reflected light intensities is obtained can be more surely formed. Further, since the content of the fine particles is 0.5 mass % or less, aggregates are not excessively generated, internal diffusion and/or generation of large concavities and convexities on the surface of the functional layer can be suppressed, and cloudiness can be therefore suppressed. The lower limit of the content of the fine particles is more preferably 0.5 mass % or more while the upper limit of the content of the fine particles is more preferably 3.0 mass % or less.

The fine particles preferably have spherical shapes in a single-particle state. Such a spherical single particle of the fine particles allows an image excellent in contrast when an optical film is placed on the image display surface of an image display apparatus. As used herein, "spherical shape" means those encompassing, e.g., true-spherical shapes, ellipsoidally spherical shapes, and the like, but not encompassing any so-called indefinite shapes.

When inorganic oxide fine particles are used as the fine particles, the inorganic oxide fine particles preferably have an average primary particle diameter of 1 nm or more and 100 nm or less. The average primary particle diameter of the fine particles of 1 nm or more allows easier formation of a functional layer having a concavo-convex surface in which the specific angle distribution of reflected light intensities is obtained, while the average primary particle diameter of 100 nm or less allows the suppression of the diffusion of light due to the fine particles to provide excellent dark room contrast. The lower limit of the average primary particle diameter of the fine particles is more preferably 5 nm or more while the upper limit of the average primary particle diameter of the fine particles is more preferably 50 nm or less. The average primary particle diameter of the fine particles is a value measured using image processing software from an image by a cross-sectional electron microscope (preferably a transmission electron microscope, such as TEM or STEM, with a magnification of 50000 times or more).

When organic fine particles are used as the fine particle, diffusion of light by the fine particles can be suppressed since a refractive index difference between the organic fine particles and a binder resin can be easily reduced to, e.g., less than 0.01, by changing the copolymerization ratio of the resin having a different refractive index. Therefore, the average primary particle diameter may be less than 8.0 μm, preferably 5.0 μm or less.

When inorganic oxide fine particles are used as the fine particles, the average particle diameter of the aggregates of the inorganic oxide fine particles is preferably 100 nm or more and 2.0 μm or less. A concavo-convex surface in which the specific angle distribution of reflected light intensities is obtained can be easily formed in the case of 100 nm or more while, in the case of 2.0 μm or less, diffusion of light by the aggregates of the fine particles can be suppressed and an image display apparatus with an optical film excellent in dark room contrast can be obtained. The lower and upper limits of the average particle diameter of the aggregates of the fine particles are preferably 200 nm or more and 1.5 μm or less, respectively.

The average particle diameter of the aggregates of inorganic oxide fine particles is obtained by selecting a region of 5 μm in each direction, containing many aggregates of the inorganic oxide fine particles, by observation with a cross-sectional electron microscope (around 10000-20000 times), measuring the particle diameters of the aggregates of the inorganic oxide fine particles in the region, and averaging the particle diameters of the aggregates of the 10 top-ranked inorganic oxide fine particles. The above-described "particle diameter of aggregate of inorganic oxide fine particles", when the cross section of an aggregate of the inorganic oxide fine particles is sandwiched between two arbitrary parallel straight lines, is measured as a distance between the straight lines in such a combination of the two lines that the distance between the two straight lines is maximum. The particle diameter of an aggregate of the inorganic oxide fine particles may also be calculated using image analysis software.

When silica particles are used as the fine particles, fumed silica fine particles are preferred among silica particles from the viewpoint of allowing easy formation of a functional layer having a concavo-convex surface in which the specific angle distribution of reflected light intensities is obtained. A fumed silica is an amorphous silica that is produced by a dry method and has a particle diameter of 200 nm or less and can be obtained by reacting a volatile compound containing silicon in a vapor phase. Specific examples thereof include a product obtained by hydrolyzing a silicon compound such as silicon tetrachloride ($SiCl_4$) in oxygen and hydrogen flames; and the like. Examples of commercially available products of fumed silica fine particles include AEROSIL R805, manufactured by Nippon Aerosil Co., Ltd.; and the like.

There are fumed silica fine particles which exhibit hydrophilicity and hydrophobicity. Among them, the fumed silica fine particles that exhibit the hydrophobicity are preferred from the viewpoint of the reduced amount of absorbed water and facilitated dispersion in a composition for a functional layer. A hydrophobic fumed silica can be obtained by chemically reacting silanol groups present on the surfaces of the fumed silica fine particles with such a surface treatment agent as described above. The fumed silica is most preferably subjected to octylsilane treatment from the viewpoint of easily obtaining such an aggregate as described above.

Fumed silica fine particles form aggregates. In a composition for a functional layer, the aggregates of the fumed silica fine particles are not dense aggregates but sufficiently nondense aggregates having shapes such as basket and coiled shapes are formed. Therefore, the aggregates of the fumed silica fine particles are easily and homogeneously deformed during shrinkage on curing of a photopolymerizable compound to be a binder resin after curing. As a result, a functional layer having a concavo-convex surface in which the specific angle distribution of reflected light intensities is obtained can be formed.

(Binder Resin)

A binder resin is obtained by polymerizing (crosslinking) a photopolymerizable compound by light irradiation. The photopolymerizable compound has at least one photopolymerizable functional group. As used herein, "photopolymerizable functional group" refers to a functional group which can be polymerized by light irradiation. Examples of the photopolymerizable functional group include groups having an ethylenic double bond, such as (meth)acryloyl groups, vinyl groups, and allyl groups. "(Meth)acryloyl groups" means both of "acryloyl group" and "methacryloyl group". Examples of the light that is irradiated when the photopolymerizable compound is polymerized include visible light rays and ionizing radiations such as ultraviolet rays, X-rays, electron rays, α-rays, β-rays, and γ-rays.

Examples of the photopolymerizable compound include photopolymerizable monomers, photopolymerizable oligomers, or photopolymerizable polymers, which may be appropriately adjusted to be used. As the photopolymerizable compound, a combination of a photopolymerizable monomer with a photopolymerizable oligomer or a photopolymerizable polymer is preferred. When the mixture region 11A is formed, at least a photopolymerizable monomer is allowed to be contained as the photopolymerizable compound.

Photopolymerizable Monomer

A photopolymerizable monomer has a weight average molecular weight of 1000 or less. A weight average molecular weight of the photopolymerizable monomer of 1000 or less enables the photopolymerizable monomer to permeate the light transmissive base material 11 with a solvent permeating the light transmissive base material 11. As a result, the mixture region 11A, in which the light transmissive base material 11 is mixed with a resin containing the photopolymerizable monomer as a monomer unit, for reducing a refractive index between the light transmissive base material 11 and the functional layer 12 can be formed in the vicinity of the interface of the functional layer 12 in the light transmissive base material 11. Not only one kind but also a plurality of kinds of such photopolymerizable monomers may be used.

As the photopolymerizable monomer, a polyfunctional monomer having two (i.e., bifunctional) or more photopolymerizable functional groups is preferred.

Examples of bi- or multi-functional monomers include trimethylolpropane tri(meth)acrylate, tripropylene glycol di(meth)acrylate, diethylene glycol di(meth)acrylate, dipropylene glycol di(meth)acrylate, pentaerythritol tri(meth)acrylate, pentaerythritol tetra(meth)acrylate, dipentaerythritol hexa(meth)acrylate, 1,6-hexanediol di(meth)acrylate, neopentyl glycol di(meth)acrylate, trimethylolpropane tri(meth)acrylate, ditrimethylolpropane tetra(meth)acrylate, dipentaerythritol penta(meth)acrylate, tripentaerythritol octa(meth)acrylate, tetrapentaerythritol deca(meth)acrylate, isocyanuric acid tri(meth)acrylate, isocyanuric acid di(meth)acrylate, polyester tri(meth)acrylate, polyester di(meth)acrylate, bisphenol di(meth)acrylate, diglycerol tetra(meth)acrylate, adamanthyl di(meth)acrylate, isobornyl di(meth)acrylate, dicyclopentane di(meth)acrylate, tricyclodecane di(meth)acrylate, and ditrimethylolpropane tetra(meth)acrylate, and monomers obtained by modifying them with PO, EO, and the like.

Among them, pentaerythritol triacrylate (PETA), dipentaerythritol hexaacrylate (DPHA), pentaerythritol tetraacrylate (PETTA), dipentaerythritol pentaacrylate (DPPA), and the like are preferred from the viewpoint of obtaining a functional layer having high hardness.

Photopolymerizable Oligomer

A photopolymerizable oligomer has a weight average molecular weight of more than 1000 and 10000 or less. As such photopolymerizable oligomers, polyfunctional oligomers having three (trifunctional) or more photopolymerizable functional groups are preferred. As such photopolymerizable oligomers, bi- or multi-functional polyfunctional oligomers are preferred. Examples of the polyfunctional oligomers include polyester (meth)acrylates, urethane (meth)acrylates, polyester-urethane (meth)acrylates, polyether (meth)acrylates, polyol (meth)acrylates, melamine (meth)acrylates, isocyanurate (meth)acrylates, epoxy (meth)acrylates, and the like.

Photopolymerizable Polymer

A photopolymerizable polymer has a weight average molecular weight of more than 10000, and the weight average molecular weight is preferably 10000 or more and 80000 or less, more preferably 10000 or more and 40000 or less. When the weight average molecular weight is more than 80000, coating suitability might be deteriorated due to high viscosity to deteriorate the appearance of an obtained multilayer optical film. Examples of the above-described polyfunctional polymer include urethane (meth)acrylates, isocyanurate (meth)acrylates, polyester-urethane (meth)acrylates, epoxy (meth)acrylates, and the like.

(Other Constituents)

In addition, a solvent drying type resin (such as a thermoplastic resin; such a resin as to become a coating only by drying a solvent added to adjust a solid content during coating) or a thermosetting resin may be optionally added to the functional layer 12.

In the case of adding the solvent drying type resin, any defect in a coating on a surface coated with a coating fluid can be effectively prevented when the functional layer 12 is formed. As the solvent drying type resin, without particular limitation, a thermoplastic resin can be typically used. Examples of the thermoplastic resin may include styrenic resins, (meth)acrylic resins, vinyl acetate resins, vinyl ether resins, halogen-containing resins, alicyclic olefinic resins, polycarbonate resins, polyester resins, polyamide resins, cellulose derivatives, silicone resins, and rubbers or elastomers.

Preferably, the thermoplastic resin is noncrystalline and is soluble in an organic solvent (particularly a common solvent in which a plurality of polymers or curable compounds can be dissolved). From the viewpoint of transparency and weather resistance, particularly preferred are styrenic resins, (meth)acrylic resins, alicyclic olefinic resins, polyester resins, cellulose derivatives (such as cellulose esters), and the like.

Examples of the thermosetting resin added to the functional layer 12 may include, but are not particularly limited to, phenol resins, urea resins, diallyl phthalate resins, melamine resins, guanamine resins, unsaturated polyester resins, polyurethane resins, epoxy resins, aminoalkyd resins, melamine-urea cocondensed resins, silicone resins, polysiloxane resins, and the like.

<<Method for Producing Optical Film>>

A method for producing such an optical film 10 as described above will be described in more detail. In the following description, the functional layer 12 is formed by the above-described method (1).

First, a composition for a functional layer is applied onto the surface of the light transmissive base material 11. Examples of methods for applying a composition for a functional layer include known application methods such as spin coating, dip methods, spray methods, slide coating methods, bar coating methods, roll coating methods, gravure coating methods, and die coating methods.

<Composition for Functional Layer>

A composition for a functional layer contains at least fine particles and a photopolymerizable compound. In addition, the above-described thermoplastic resin, the above-described thermosetting resin, a solvent, or a polymerization initiator may be optionally added to the composition for a functional layer. Further, a dispersing agent, a surfactant, an antistatic agent, a silane coupling agent, a thickener, a coloring inhibitor, a coloring agent (a pigment, a dye), an antifoaming agent, a leveling agent, a flame retardant, an ultraviolet absorbing agent, an adhesion-imparting agent, a polymerization inhibitor, an oxidation inhibitor, a surface modifier, a lubricant, or the like, known in the art, may also be added to the composition for a functional layer depending on a purpose such as increase in the hardness of a functional layer, suppression of shrinkage on curing, or control of a refractive index.

(Solvent)

Examples of the solvent may include alcohols (e.g., methanol, ethanol, propanol, isopropanol, n-butanol, s-butanol, t-butanol, benzyl alcohol, PGME, ethylene glycol), ketones (such as acetone, methyl ethyl ketone (MEK), cyclohexanone, methyl isobutyl ketone, diacetone alcohol, cycloheptanone, and diethyl ketone), ethers (such as 1,4-dioxane, dioxolane, and tetrahydrofuran), aliphatic hydrocarbons (such as hexane), alicyclic hydrocarbons (such as cyclohexane), aromatic hydrocarbons (such as toluene and xylene), halocarbons (such as dichloromethane and dichloroethane), esters (such as methyl formate, methyl acetate, ethyl acetate, propyl acetate, butyl acetate, and ethyl lactate), cellosolves (such as methyl cellosolve, ethyl cellosolve, and butyl cellosolve), cellosolve acetates, sulfoxides (such as dimethyl sulfoxide), amides (such as dimethylformamide and dimethylacetamide), and the like, and mixtures thereof.

When the mixture region 11A is formed in the vicinity of the interface between the light transmissive base material 11 and the functional layer 12 as illustrated in FIG. 1, the solvent used contains a permeable solvent that has high permeability into the light transmissive base material 11 and dissolves or swells the light transmissive base material 11, and the photopolymerizable compound used contains at least a photopolymerizable monomer having a weight average molecular weight of 1000 or less. By using the permeable solvent and the photopolymerizable monomer, not only the permeable solvent but also the photopolymerizable monomer permeates the light transmissive base material 11 and therefore the mixture region 11A in which the light transmissive base material 11 is mixed with a resin containing the photopolymerizable monomer as a monomer unit can be formed in the vicinity of the interface between the light transmissive base material 11 and the functional layer 12.

Examples of permeable solvents include ketones (acetone, methyl ethyl ketone (MEK), cyclohexanone, methyl isobutyl ketone, diacetone alcohol, cycloheptanone, diethyl ketone), esters (such as methyl formate, methyl acetate, ethyl acetate, propyl acetate, butyl acetate, and ethyl lactate), ethers (such as 1,4-dioxane, dioxolane, diisopropyl ether dioxane, and tetrahydrofuran), cellosolves (such as methyl cellosolve, ethyl cellosolve, and butyl cellosolve), cellosolve acetates, sulfoxides (such as dimethyl sulfoxide), phenols (phenol, ortho-chlorophenol), and the like. The solvents may also be mixtures thereof. Among them, as the permeable solvent, at least one selected from the group consisting of, e.g., methyl isobutyl ketone, methyl ethyl ketone, cyclohexanone, methyl acetate, ethyl acetate, propyl acetate, and butyl acetate is preferred when a triacetylcellulose base material is used as the light transmissive base material while ortho-chlorophenol is preferred when a polyester base material is used as the light transmissive base material.

(Polymerization Initiator)

A polymerization initiator is a constituent that is decomposed by light irradiation, generates a radical, and causes the initiation or progress of the polymerization (crosslinking) of a photopolymerizable compound.

The polymerization initiator is not particularly limited as long as the polymerization initiator can release a substance that initiates radical polymerization by light irradiation. Known polymerization initiators can be used without particular limitation. Specific examples of the polymerization initiators include acetophenones, benzophenones, Michler's benzoyl benzoate, α-amyloxime ester, thioxanthones, propiophenones, benzyls, benzoins, and acylphosphine oxides. Further, it is preferable to mix and use a photosensitizer, and specific examples thereof include n-butylamine, triethylamine, poly-n-butylphosphine, and the like.

As the above-described polymerization initiator, acetophenones, benzophenones, thioxanthones, benzoins, benzoin methyl ether, and the like are preferably used singly or in combination, when the above-described binder resin is a resin system having a radical polymerizable unsaturated group.

The content of the polymerization initiator in the composition for a functional layer is preferably 0.5 part by mass or more and 10.0 parts by mass or less based on 100 parts by mass of the photopolymerizable compound. The content of the polymerization initiator in this range can result in sufficiently kept hard coat performance and the suppression of curing inhibition.

The content (solid content) of a raw material in the composition for a functional layer is not particularly limited but is typically preferably 5 mass % and 70 mass % or less, more preferably 25 mass % or more and 60 mass % or less.

(Leveling Agent)

As a leveling agent, for example, silicone oil, a fluorine-based surfactant, or the like is preferred since a functional layer is prevented from having a Benard cell structure. When a resin composition containing a solvent is applied and dried, e.g., a difference between surface tensions on the outer and inner surfaces of a coating film is generated in the coating film, thereby resulting in a large number of convective flows in the coating film. A structure formed by the convective flows called a Benard cell structure, which causes problems such as orange peel and coating defects in a functional layer to be formed.

In the Benard cell structure, concavities and convexities on the surface of a functional layer might be excessively enlarged. Use of such a leveling agent as mentioned above can prevent the convective flows, and therefore not only provides a functional layer without any defect or unevenness but also facilitates the adjustment of a concavo-convex shape on the surface of the functional layer.

A method for preparing a composition for a functional layer is not particularly limited as long as each constituent can be homogeneously mixed, and the method can be carried out using a known apparatus such as a paint shaker, a bead mill, a kneader, or a mixer.

A composition for a functional layer is applied to the surface of the light transmissive base material 11, followed by being transported to a heated zone to dry the coating film-like composition for a functional layer, and drying the composition for a functional layer by any of various known methods to evaporate a solvent. The state of distribution of the aggregates of fine particles can be adjusted by selecting a solvent relative evaporation rate, solid content concentration, coating liquid temperature, drying temperature, a drying wind velocity, drying time, solvent atmosphere concentration in a drying zone, and the like.

Particularly, the methods of adjusting the state of the distribution of the aggregates of fine particles by selecting drying conditions are simple and preferable. A specific drying temperature of 30 to 120° C. and a drying wind velocity of 0.2 to 50 m/s are preferred. The state of the distribution of the aggregates of the fine particles can be adjusted to a desired state by performing dry treatment, appropriately adjusted in this range, once or several times.

By drying the composition for a functional layer, the photopolymerizable compound remains in the light transmissive base material although the permeable solvent that permeates the light transmissive base material is evaporated.

Then, by irradiating the coating film-like composition for a functional layer with light such as ultraviolet light to polymerize (crosslink) the photopolymerizable compound, the composition for a functional layer is cured to form the functional layer 12 and to form the mixture region 11A.

When ultraviolet light is used as light for curing a composition for a functional layer, there can be used ultraviolet light emitted from ultra-high-pressure mercury lamps, high-pressure mercury lamps, low-pressure mercury lamps, carbon-arc, xenon-arc and metal halide lamps, and the like. Further, a wavelength region of 190 to 380 nm may be used for the wavelength of the ultraviolet light. Specific examples of electron beam sources include various electron beam accelerators such as Cockcroft-Walton accelerators, Van de Graaff accelerators, resonance transformer accelerators, insulated core transformer accelerators, linear accelerators, Dynamitron accelerators, and high-frequency accelerators.

<<Physical Properties of Optical Film>>

The optical film 10 preferably has a total light transmittance of 85% or more. The total light transmittance of 85% or more can result in more improvement in color reproductivity and visibility when the optical film 10 is put on the surface of the image display apparatus. The total light transmittance of 90% or more is preferred. The total light transmittance can be measured by a method according to JIS K7361 using a haze meter (Instrument identification: HM-150, manufactured by MURAKAMI COLOR RESEARCH LABORATORY).

The optical film 10 preferably has a haze value of less than 1%. The haze value of less than 1% can result in desired optical properties and visibility that is more improved when the optical film 10 is placed on an image display surface. The haze value is more preferably 0.5% or less, further preferably 0.3% or less. The haze value can be measured by a method according to JIS K7136 using a haze meter (Instrument identification: HM-150, manufactured by MURAKAMI COLOR RESEARCH LABORATORY).

The optical film 10 preferably has a transmission image clarity of 75% or more and less than 95% with a comb of 0.125 mm and a transmission image clarity of 95% or more with a comb of 2.0 mm. The transmission image clarity of 75% or more with a comb of 0.125 mm can result in more improvement in the clarity of an image to obtain superior image quality when the image is displayed. Further, the transmission image clarity of 95% or less can result in more preferable prevention of any interference fringe. The transmission image clarity with the comb of 0.125 mm is more preferably 80% or more and 90% or less. Further, the transmission image clarity of 95% or more with the comb of 2.0 mm can result in more improvement in the clarity of an image and the suppression of cloudiness due to the diffuse reflection of extraneous light. The transmission image clarity can be measured by a method according to a transmission method for image clarity in JIS K7105 using an image clarity measuring device (instrument identification: ICM-1T, manufactured by Suga Test Instruments Co., Ltd.).

The optical film 10 preferably has a contrast ratio of 80% or more, more preferably 90% or more. The contrast ratio of 80% or more can result in excellent dark room contrast and more improved visibility when the optical film 10 is put on the surface of the image display apparatus.

The above-described contrast ratio as used herein is a value measured by the following method. First, two polarizing plates (AMN-3244TP, manufactured by SAMSUNG ELECTRONICS CO., LTD.) are used employing a backlight unit in which a diffuser panel is placed on a cold cathode tube light source, a value ($L_{max}/L_{min}$) obtained by dividing $L_{max}$ of the luminance of light passing when the polarizing plates are placed in a parallel nicol by $L_{min}$ of the luminance of light passing when the polarizing plates are placed in a cross nicol is regarded as a contrast, and a value obtained by dividing the contrast ($L_1$) of the optical film (light transmissive base material+functional layer, etc.) by the contrast ($L_2$) of the light transmissive base material, ($L_1/L_2$)×100(%), is determined as the contrast ratio. The luminances are measured in a dark room. The above-described luminances are measured using a color luminance meter (BM-5A, manufactured by Topcon Corporation) with the measurement angle of the color luminance meter set to 1° and a visual field diameter of 5 mm on a sample. Further, a backlight quantity is set so that a luminance at which the two polarizing plates are placed in the parallel nicol in the state in which no sample is placed is 3600 cd/m².

In accordance with the present embodiment, in a state in which the concavo-convex surface 12A of the functional layer 12 is irradiated with parallel light travelling in a direction sloped at 10° with respect to a normal direction N of the optical film 10, in the angle distribution of reflected light intensities measured in a plane including both directions of the normal direction N and the travelling direction T of the parallel light, a value obtained by subtracting a width of an angle region, in which a reflected light intensity that is not less than ½ of a maximum reflected light intensity is measured, from a width of an angle region, in which a reflected light intensity that is not less than 1/100 of the maximum reflected light intensity is measured, is 0.7° or more and 1.4° or less, and therefore, for the reasons mentioned above, interference fringes can be suppressed from being generated and cloudiness is not observed. Further, since the interference fringes can be suppressed from being generated due to the concavo-convex surface 12A of the functional layer 12, the thickness of the mixture region can be reduced. As a result, the thickness of the functional layer can be reduced to reduce a manufacture cost.

In a conventional antireflection film, light other than regular reflection light and regular transmission light has been considered to deteriorate image quality and therefore the presence of diffused light in itself in the antireflection film has been considered to be negative. For example, even if it was necessary to add fine particles, e.g., in order to improve hard coat properties, materials and manufacture conditions have been selected with an eye only toward preventing diffused light from being generated by aggregating the fine particles to have large particle diameters. That is, a flat surface has been required for the antireflection film in order to obtain a sharp image without cloudiness by prevention of the generation of diffused light, and it has not been possibly conceivable that diffused light is generated. In contrast, in a conventional antiglare film, since the prevention of the reflection of an external image is the action in itself of the antiglare film, it is required to surely diffuse an external image reflecting an observer. Therefore, in the antiglare film, a value obtained by subtracting a ½ angle width from a 1/100 angle width, specified in the present invention, is not sufficient, and a greater value than the value is necessary. Thus, the above-described effects provided by allowing a value obtained by subtracting a ½ angle width from a 1/100 angle width to be 0.7° or more and 1.4° or less are considered to be remarkable effects beyond an expectable range in light of the technical standards of the conventional antireflection and antiglare films.

<<Polarizing Plate>>

Figure 3:
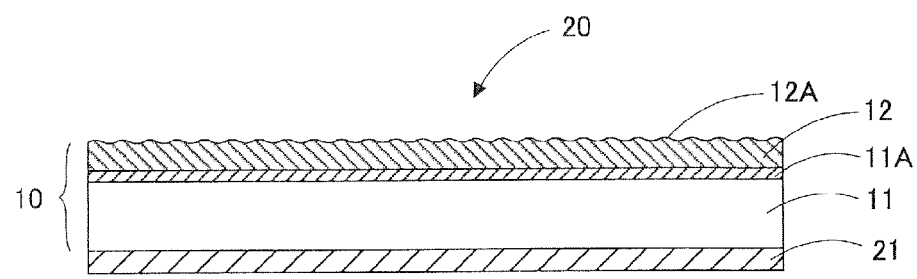
FIG. 3 is a schematic view illustrating the configuration of a polarizing plate according to the first embodiment.

An optical film 10 may be incorporated, for example, into a polarizing plate and be used. FIG. 3 is a schematic view illustrating the configuration of a polarizing plate into which the optical film according to the present embodiment is incorporated. As illustrated in FIG. 3, a polarizing plate 20 includes the optical film 10, a polarizing element 21, and a protective film 22. The polarizing element 21 is formed on a surface of the light transmissive base material 11 and the surface of the polarizing element 21 is opposite to the other surface thereof on which the functional layer 12 is formed. The protective film 22 is placed on a surface of the polarizing element 21 and the surface of the protective film 22 is opposite to the other surface thereof on which the optical film 10 is placed. The protective film 22 may also be a retardation film.

Examples of the polarizing element 21 include polyvinyl alcohol films, polyvinyl formal films, polyvinyl acetal films, ethylene-vinyl acetate copolymer-based saponified films, and the like, dyed with iodine or the like and stretched. When the optical film 10 and the polarizing element 21 are laminated, it is preferable to previously subject the light transmissive base material 11 to saponification treatment. Better adhesiveness and an antistatic effect can also be obtained by the saponification treatment.

<<Liquid Crystal Panel>>

Figure 4:
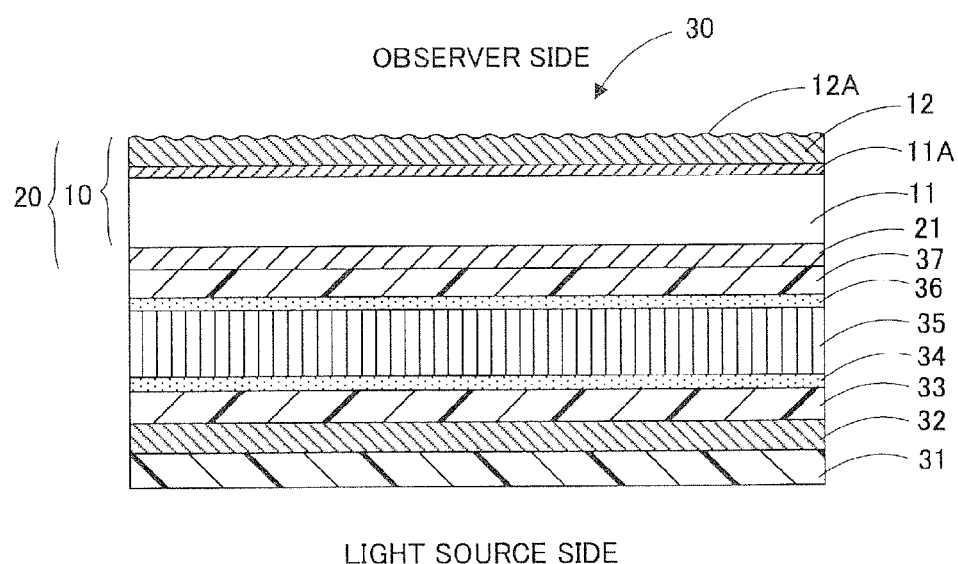
FIG. 4 is a schematic view illustrating the configuration of a liquid crystal panel according to the first embodiment.

An optical film 10 and a polarizing plate 20 may be incorporated into a liquid crystal panel and be used. FIG. 4 is a schematic view illustrating the configuration of a liquid crystal panel into which the optical film according to the present embodiment is incorporated.

The liquid crystal panel illustrated in FIG. 4 has a structure in which a protective film 31 such as a triacetylcellulose film (TAC film), a polarizing element 32, a retardation film 33, an adhesive layer 34, a liquid crystal cell 35, an adhesive layer 36, a retardation film 37, a polarizing element 21, and the optical film 10 are laminated in the order mentioned from a light source side (backlight unit side) to an observer side. In the liquid crystal cell 35, a liquid crystal layer, an oriented film, an electrode layer, a color filter, and the like are placed between two glass base materials.

Examples of the retardation films 33 and 37 include triacetylcellulose films and cycloolefin polymer films. The retardation film 37 may also be the same as the protective film 22. Examples of adhesives constituting the adhesive layers 34 and 36 include pressure-sensitive adhesives (PSAs).

<<Image Display Apparatus>>

Figure 5:
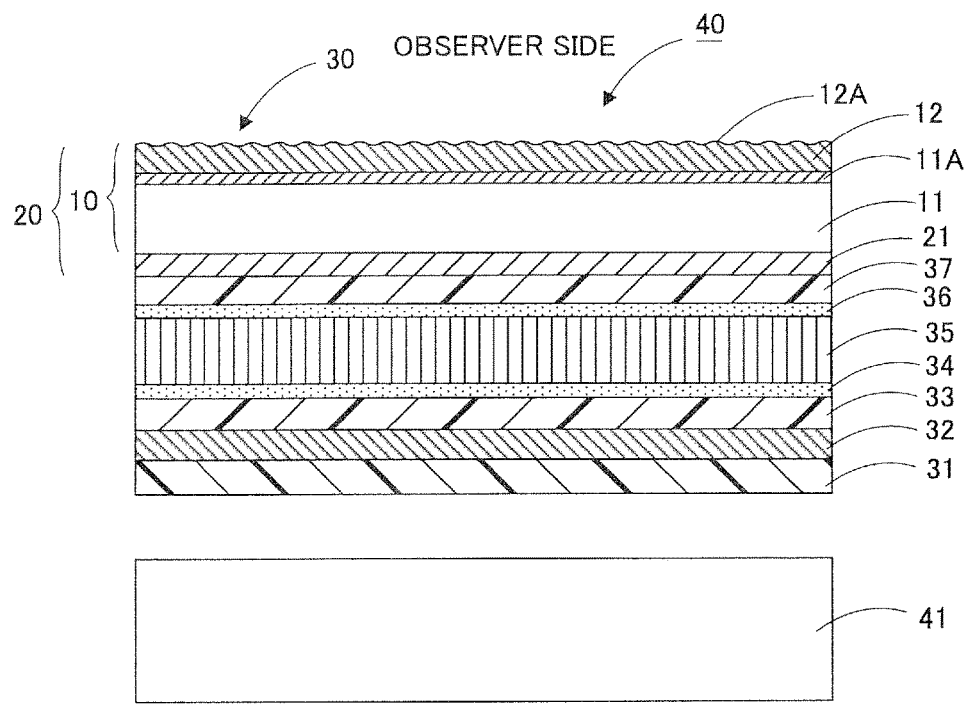
FIG. 5 is a schematic view illustrating the configuration of a liquid crystal display which is an example of an image display apparatus according to the first embodiment.

An optical film 10, a polarizing plate 20, and a liquid crystal panel 30 may be incorporated into an image display apparatus and be used. Examples of the image display apparatus include liquid crystal displays (LCDs), cathode ray tube displays (CRTs), plasma displays (PDPs), electroluminescence displays (ELDs), field emission displays (FEDs), touch panels, tablet PCs, electronic papers, and the like. FIG. 5 is a schematic view illustrating the configuration of a liquid crystal display which is an example of the image display apparatus into which the optical film according to the present embodiment is incorporated.

An image display apparatus 40 illustrated in FIG. 5 is a liquid crystal display. The image display apparatus 40 is configured by a backlight unit 41; and the liquid crystal panel 30 including the optical film 10 placed in a side closer to an observer side than the backlight unit 41. As the backlight unit 41, a known backlight unit can be used.

Second Embodiment

Figure 6:
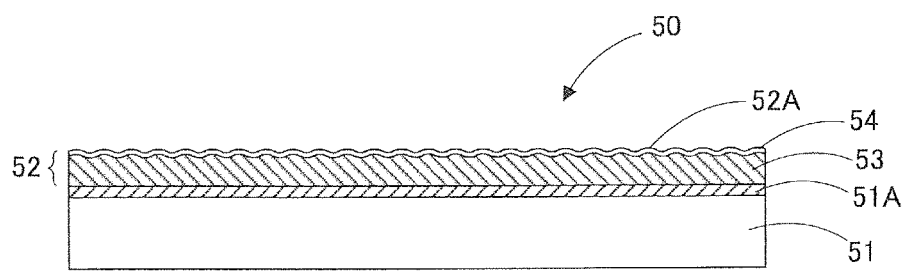
FIG. 6 is a schematic view illustrating the configuration of an optical film according to a second embodiment.
Figure 7:
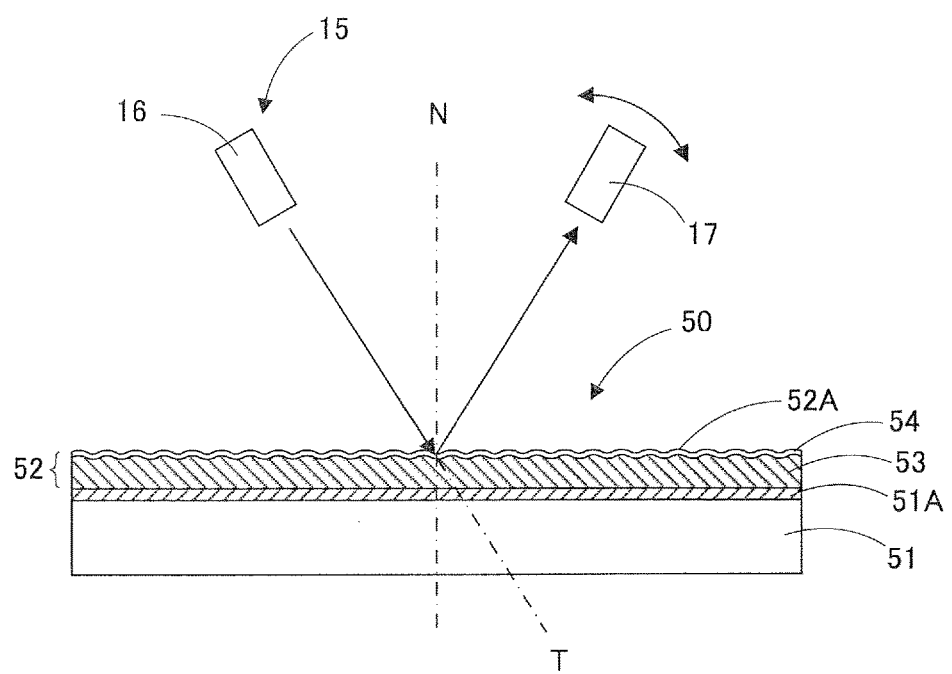
FIG. 7 is a schematic view illustrating a state in which the angle distribution of reflected light intensities in the optical film according to the second embodiment is measured with a variable angle photometer.

An optical film according to a second embodiment of the present invention will be described below with reference to the drawings. FIG. 6 is a schematic view illustrating the configuration of the optical film according to the present embodiment; and FIG. 7 is a schematic view illustrating a state in which the angle distribution of reflected light intensities in the optical film according to the present embodiment is measured with a variable angle photometer.

<<Optical Film>>

As illustrated in FIG. 6, an optical film 50 includes at least a light transmissive base material 51 and a functional layer 52 disposed on the light transmissive base material 51. The description of the light transmissive base material 51 is omitted in this embodiment since the light transmissive base material 51 is similar to the light transmissive base material 11 described in the first embodiment. In the vicinity of the interface between the light transmissive base material 51 and the functional layer 52 (in the vicinity of the interface between the light transmissive base material 51 and a hard coat layer 53 described below), it is preferable to form a mixture region 51A in which the light transmissive base material 52 and the constituent of the binder resin of the hard coat layer 53 are mixed as illustrated in FIG. 6.

(Functional Layer)

In the present embodiment, the functional layer 52 is configured by the hard coat layer 53 and a low refractive index layer 54 disposed on the hard coat layer 53. The functional layer 52 has a concavo-convex surface 52A, which forms a surface of the optical film 50, and the concavo-convex surface 52A of the functional layer 52 is a surface of the low refractive index layer 54.

In the optical film 50, in a state in which the concavo-convex surface 52A of the functional layer 52 (surface of low refractive index layer 54) is irradiated with parallel light travelling in a direction sloped at 10° with respect to a normal direction N of the optical film 50, in the angle distribution of reflected light intensities measured in a plane including both directions of the normal direction N and the travelling direction T of the parallel light, a value obtained by subtracting a ½ angle width from a 1/100 angle width is also 0.7° or more and 1.4° or less in the same manner as in the case of the optical film 10, as illustrated in FIG. 7. As illustrated in FIG. 7, the angle distribution of reflected light intensities can be measured with the variable angle photometer 15 explained in the first embodiment.

The lower limit of a value obtained by subtracting a ½ angle width from a 1/100 angle width is preferably 0.8° or more, more preferably 0.9° or more. Further, the upper limit of a value obtained by subtracting a ½ angle width from a 1/100 angle width is preferably 1.3° or less, more preferably 1.4° or less.

Further, the rate of a region in which a surface angle is 0.05° or more, RΔq, Sm, θa, Ra, Ry, and Rz of the concavo-convex surface 52A of the functional layer 52 are preferably similar to those of the concavo-convex surface 12A of the functional layer 12.

(Hard Coat Layer)

The description of the hard coat layer 53 is omitted in the present embodiment since the hard coat layer 53 is similar to the functional layer 12 described in the first embodiment. However, unlike the functional layer 12, in the surface of the hard coat layer 53, it is not necessary that a value obtained by subtracting a ½ angle width from a 1/100 angle width is 0.7° or more and 1.4° or less.

(Low Refractive Index Layer)

The low refractive index layer 54 is intended to reduce the reflectance of light from the outside (e.g., fluorescent lamp, natural light, etc.), reflected on the surface of the optical film 50. The low refractive index layer 54 has a refractive index that is lower than that of the hard coat layer 53. Specifically, for example, the low refractive index layer preferably has a refractive index of 1.45 or less, more preferably a refractive index of 1.42 or less.

The thickness of the low refractive index layer 54 is not particularly limited but may be typically appropriately set within the range of around 30 nm to 1 μm. The thickness $d_A$ (nm) of the low refractive index layer 54 preferably satisfies the following expression (5):

$$d_A = m\lambda/(4n_A) \quad (5)$$

In the above-described expression, $n_A$ represents the refractive index of the low refractive index layer; m represents a positive odd number, preferably 1; and λ is a wavelength, preferably a value in the range of 480 nm or more and 580 nm or less.

From the viewpoint of a lower reflectance, the low refractive index layer 54 preferably satisfies the following expression (6):

$$120 < n_A d_A < 145 \quad (6)$$

As for the low refractive index layer, the single layer provides an effect while two or more low refractive index layers can be appropriately placed for the purpose of adjusting a lower minimum reflectance or a higher minimum reflectance. When the two or more low refractive index layers are placed, the refractive indices and thicknesses of the respective low refractive index layers are preferably different.

The low refractive index layer 54 can be preferably constituted by any of 1) a resin containing low refractive index particles of silica, magnesium fluoride, or the like; 2) a fluorinated resin which is a low refractive index resin; 3) a fluorinated resin containing silica or magnesium fluoride; 4) a thin film with a low refractive index substance such as silica or magnesium fluoride; and the like. As a resin except the fluorinated resins, a resin similar to the binder resin constituting the above-mentioned functional layer can be used.

Further, silica is preferably a hollow silica fine particle, and such hollow silica fine particles can be produced, for example, by a production method described in Examples in Japanese Patent Laid-Open No. 2005-099778.

For the fluorinated resins, a polymerizable compound containing at least a fluorine atom in a molecule or a polymer thereof may be used. The polymerizable compound is not particularly limited but preferably has a curing reactive group such as a photopolymerizable functional group or a polar group which is thermally cured. Also, the polymerizable compound may be a compound simultaneously having these reactive groups together. In contrast to the polymerizable compound, the polymer does not have any reactive group as described above.

As such photopolymerizable compounds, a wide variety of fluorine-containing monomers having ethylenically unsaturated bonds may be used. More specifically, examples thereof may include fluoroolefins (such as fluoroethylene, vinylidene fluoride, tetrafluoroethylene, hexafluoropropylene, perfluorobutadiene, and perfluoro-2,2-dimethyl-1,3-dioxole). As (meth)acryloyloxy group-containing compounds, there may also be mentioned (meth)acrylate compounds with fluorine atoms in a molecule, such as 2,2,2-trifluoroethyl(meth)acrylate, 2,2,3,3,3-pentafluoropropyl(meth)acrylate, 2-(perfluorobutyl)ethyl(meth)acrylate, 2-(perfluorohexyl)ethyl(meth)acrylate, 2-(perfluorooctyl)ethyl(meth)acrylate, 2-(perfluorodecyl)ethyl(meth)acrylate, methyl α-trifluoromethacrylate, and ethyl α-trifluoromethacrylate; fluorine-containing polyfunctional (meth)acrylic acid ester compounds having in a molecule a $C_1$-$C_{14}$ fluoroalkyl, fluorocycloalkyl or fluoroalkylene group with at least three fluorine atoms, and at least two (meth)acryloyloxy groups; and the like.

As examples of the above-described polar group which is thermally cured, there are preferred hydrogen bond-forming groups such as hydroxyl, carboxyl, amino and epoxy groups. These are excellent not only in adhesiveness with coating films but also in affinity with inorganic ultrafine particles such as silica. Examples of polymerizable compounds having thermosetting polar groups include 4-fluoroethylene-perfluoroalkylvinyl ether copolymers; fluoroethylene-hydrocarbon-based vinyl ether copolymers; fluorine-modified products of various resins such as epoxy, polyurethane, cellulose, phenol and polyimide resins; and the like.

Examples of polymerizable compounds having both photopolymerizable functional groups and polar groups which are thermally cured, as described above, may include partially or fully fluorinated alkyl, alkenyl and aryl esters of acrylic or methacrylic acid; fully or partially fluorinated vinyl ethers; fully or partially fluorinated vinyl esters; fully or partially fluorinated vinyl ketones; and the like.

Examples of the fluorinated resins may include: polymers of monomers or monomer mixtures containing at least one fluorine-containing (meth)acrylate compound of the above-described polymerizable compounds with ionizing radiation curable groups; copolymers of at least one of the above-described fluorine-containing (meth)acrylate compounds with a (meth)acrylate compound containing no fluorine atom in a molecule, such as methyl(meth)acrylate, ethyl(meth)acrylate, propyl(meth)acrylate, butyl(meth)acrylate or 2-ethylhexyl(meth)acrylate; fluorine monomer-containing homopolymers or copolymers such as fluoroethylene, vinylidene fluoride, trifluoroethylene, chlorotrifluoroethylene, 3,3,3-trifluoropropylene, 1,1,2-trichloro-3,3,3-trifluoropropylene or hexafluoropropylene; and the like. Silicone-containing vinylidene fluoride copolymers obtained by containing a silicone component in these copolymers may also be used. Examples of silicone components in this case include (poly)dimethylsiloxane, (poly)diethylsiloxane, (poly)diphenylsiloxane, (poly)methylphenylsiloxane, alkyl-modified (poly)dimethylsiloxane, azo group-containing (poly)dimethylsiloxane, dimethylsilicone, phenyl methylsilicone, alkyl/aralkyl-modified silicone, fluorosilicone, polyether-modified silicone, fatty acid ester-modified silicone, methylhydrogen silicone, silanol group-containing silicone, alkoxy group-containing silicone, phenol group-containing silicone, methacryl-modified silicone, acryl-modified silicone, amino-modified silicone, carboxylic acid-modified silicone, carbinol-modified silicone, epoxy-modified silicone, mercapto-modified silicone, fluorine-modified silicone, polyether-modified silicone, and the like. Compounds with dimethylsiloxane structures are preferred among the above.

Furthermore, non-polymers or polymers containing such compounds as described below may also be used as the fluorinated resins. That is, there may be used compounds obtained by reacting fluorine-containing compounds having at least one isocyanate group in a molecule with compounds having at least one isocyanate group-reacting functional group such as an amino, hydroxyl or carboxyl group in a molecule; compounds obtained by reacting fluorine-containing polyols such as fluorine-containing polyether polyols, fluorine-containing alkyl polyols, fluorine-containing polyester polyols, and fluorine-containing ε-caprolactone-modified polyols, with isocyanate group-containing compounds; and the like.

Also, such various binder resins as the above-described functional layer 12 may be mixed with the above-described polymerizable compounds having fluorine atoms and polymers and be used. Furthermore, there may be appropriately used a curing agent for curing a reactive group and/or the like as well as various additives and solvents for improving coating properties and for imparting antifouling properties.

For forming the low refractive index layer 54, the viscosity of a composition for a low refractive index layer obtained by adding the above-mentioned materials is preferably 0.5 to 5 mPa·s (25° C.) at which preferred application properties are obtained, preferably in the range of 0.7 to 3 mPa·s (25° C.). An antireflection layer with excellent visible light rays can be realized, a homogeneous thin film without application unevenness can be formed, and a low refractive index layer which is particularly excellent in adhesiveness can be formed.

Means for curing a composition for a low refractive index layer may be the same as described in the above-mentioned functional layer 12. When heating means is used for curing treatment, a thermal polymerization initiator that generates, e.g., radicals to initiate polymerization of the polymerizable compound by heating is preferably added to the fluorinated resin composition.

In accordance with the present embodiment, in a state in which the concavo-convex surface 52A of the functional layer 52 is irradiated with parallel light travelling in a direction sloped at 10° with respect to a normal direction N of the optical film 50, in the angle distribution of reflected light intensities measured in a plane including both directions of the normal direction N and the travelling direction of the parallel light, a value obtained by subtracting a ½ angle width from a 1/100 angle width is 0.7° or more and 1.4° or less, and therefore, interference fringes can be suppressed from being generated, cloudiness is not observed, and a manufacture cost can be reduced, as explained in the first embodiment.

Third Embodiment

Figure 8:
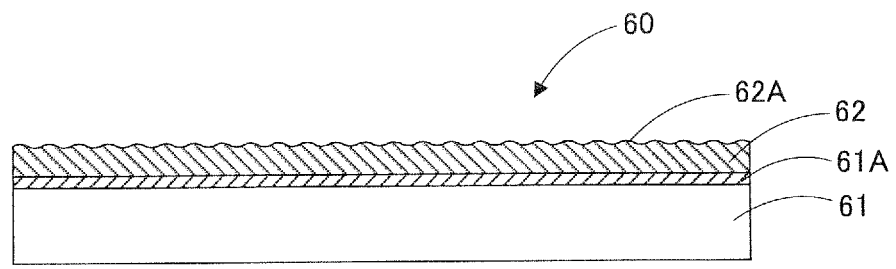
FIG. 8 is a schematic view illustrating the configuration of an optical film according to a third embodiment.
Figure 9:
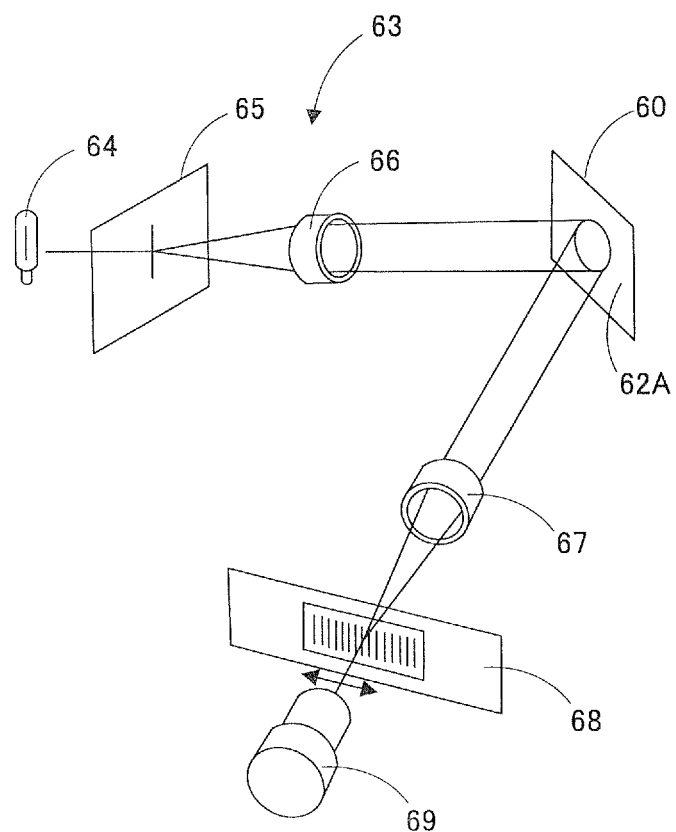
FIG. 9 is a schematic view illustrating a state in which the reflection clarity of the optical film according to the third embodiment is measured with a reflection clarity measuring apparatus.

An optical film according to a third embodiment of the present invention will be described below with reference to the drawings. FIG. 8 is a schematic view illustrating the configuration of the optical film according to the present embodiment; and FIG. 9 is a schematic view illustrating a state in which the reflection clarity of the optical film according to the present embodiment is measured with a reflection clarity measuring apparatus.

<<Optical Film>>

As illustrated in FIG. 8, an optical film 60 includes at least a light transmissive base material 61 and a functional layer 62 disposed on the light transmissive base material 61. In the vicinity of the interface between the light transmissive base material 61 and the functional layer 62, it is preferable to form a mixture region 61A in which the light transmissive base material 61 is mixed with a resin containing as a monomer unit a photopolymerizable monomer having a weight average molecular weight of 1000 or less, as illustrated in FIG. 8.

<Light Transmissive Base Material, Mixture Region>

The description of the light transmissive base material 61 and the mixture region 61A is omitted since the light transmissive base material 61 and the mixture region 61A are similar to the light transmissive base material 11 and mixture region 11A described in the first embodiment.

<Functional Layer>

A functional layer is a layer intended to exert any function in an optical film and specific examples thereof include layers that exert a function such as a hard coat property, an antireflection property, an antistatic property, or an antifouling property. The functional layer may be not only a single layer but also a layer in which two or more layers are laminated. The functional layer 62 according to the present embodiment functions as a hard coat layer. The functional layer 62 according to the present embodiment is a single layer and functions as a hard coat layer but, for example, a functional layer may also be configured by a hard coat layer and another functional layer disposed between the hard coat layer and a light transmissive base material. In this case, a surface of an optical film (concavo-convex surface of the functional layer) is a surface of the hard coat layer. Further, a functional layer may also be configured by a first hard coat layer having concavities and convexities on its surface and a second hard coat layer that is disposed on the first hard coat layer and is for adjusting the concavities and convexities on the surface of the first hard coat layer or may also be configured by a hard coat layer having concavities and convexities on its surface and a low refractive index layer that is disposed on the hard coat layer and has a lower refractive index than that of the hard coat layer as described in the second embodiment. In this case, a surface of an optical film (concavo-convex surface of the functional layer) is a surface of the second hard coat layer or the low refractive index layer.

The functional layer 62 has the concavo-convex surface 62A, which forms a surface of the optical film 60. In the optical film 60, the reflection clarity of the concavo-convex surface 62A, measured using a 0.5 mm-width optical comb, is 90% or less, while the reflection clarity of the concavo-convex surface 62A, measured using a 2.0 mm-width optical comb, is 80% or more.

The upper limit of the reflection clarity measured using a 0.5 mm-width optical comb is preferably 80% or less, more preferably 70% or less. Further, the lower limit of the reflection clarity measured using a 0.5 mm-width optical comb is preferably 10% or more, more preferably 20% or more.

The lower limit of the reflection clarity measured using a 2.0 mm-width optical comb is preferably 85% or more, more preferably 90% or more. Further, the upper limit of the reflection clarity measured using a 2.0 mm-width optical comb is 100% by definition.

The reflection clarity can be measured by a reflection clarity measuring apparatus according to an image clarity reflection method in JIS K7105. Such measuring apparatuses include an image clarity measuring device ICM-1T manufactured by Suga Test Instruments Co., Ltd., and the like.

The reflection clarity measuring apparatus 63 includes a light source 64, a slit 65, a lens 66, a lens 67, an optical comb 68, and a photoreceiver 69 as illustrated in FIG. 9. In the reflection clarity measuring apparatus 63, light emitted from the light source 64 and passing through the slit 65 is made to be parallel light through the lens 66, the concavo-convex surface 62A of the optical film 60 is irradiated with the parallel light, parallel light reflected on the concavo-convex surface 62A of the optical film 60 is concentrated through the lens 67, and light passing through the optical comb 68 is received by the photoreceiver 69. Based on the amount of the light received by the photoreceiver 69, a reflection clarity C is calculated from the following expression (7):

$$C(\%) = \{(M-m)/(M+m)\} \times 100 \quad (7)$$

In the expression (7), M is a maximum wave height, and m is a minimum wave height.

The optical comb 68 can be moved along the longitudinal direction of the optical comb 68 and includes dark sections and light sections. The ratio between the widths of the dark and light sections of the optical comb 68 is 1:1. In JIS K7105, four optical combs having widths of 0.125 mm, 0.5 mm, 1.0 mm, and 2.0 mm are specified as an optical comb. In the present invention, the optical comb having a width of 0.5 mm and the optical comb having a width of 2.0 mm are used by the reason described below. The optical film 60 is placed so that light made to be parallel light through the lens 66 is incident on the optical film 60 at an incidence angle of 45°.

The reason of measuring a reflection clarity using the 0.5 mm-width optical comb and the 2.0 mm-width optical comb in the present invention is as follows. When the surface of the optical film is a concavo-convex surface, the diffusibility of reflected light is higher than that in the case of a flat surface. That is, the level of diffusion reflected light component is increased. When not less than a certain level of diffusion reflected light is present, rainbow colors generated by interference are mixed, the mixed color arrives at an observer and therefore is not recognized as interference fringes, and interference fringes can be suppressed from being generated. However, there is a fear that light is recognized as cloudiness by the human eye since the amount of reflected light arriving at the human eye is increased when not less than a certain level of diffusion reflected light component with an excessively large diffusion angle based on regular reflection is present. The present inventor extensively examined this point and found that when a certain level of diffusion reflected light component having an adequate diffusion angle is present on a surface of the optical film, interference fringes can be suppressed from being generated, and the generation of cloudiness equivalent to regular reflection is not recognized by the detection capability of the human eye. Furthermore, the present inventor found that two optical combs of a 0.5 mm-width optical comb and a 2.0 mm-width optical comb are used, and each reflection clarity thereof is measured and evaluated, whereby the substantial level of present diffusion reflected light component having an adequate diffusion angle can be evaluated. Specifically, reflection clarity can be considered to be decreased with increasing the level of diffusion reflected light component. Since the diffusion reflected light component is a component that can suppress the generation of interference fringes as described above, the reflection clarity is specified as 90% or less in measurement using the 0.5 mm-width optical comb in the present invention. However, even if the reflection clarity is specified as 90% or less in the measurement using the 0.5 mm-width optical comb, the reflection clarity also becomes 90% or less in the case of the high level of diffusion reflected light component having an excessively large diffusion angle. Since there is a fear of recognition as the generation of cloudiness as described above in the case of the high level of diffusion reflected light component having an excessively large diffusion angle, it is necessary that the level of diffusion reflected light component having an excessively large diffusion angle is low. Since the widths of the light and dark sections of the 2.0 mm-width optical comb are more than those of the 0.5 mm-width optical comb, a diffusion reflected light component having an adequate diffusion angle is transmitted through a light section while a reflected light component having an excessively large diffusion angle is not transmitted due to the dark sections when an image formed through the lens 67 by the slit 65 is present on a light section of the optical comb. Conversely, when an image formed through the lens 67 by the slit 65 is present on a dark section of the optical comb, a diffusion reflected light component having an adequate diffusion angle is not transmitted due to the dark sections while a reflected light component having an excessively large diffusion angle is transmitted through a light section. Thus, in the present invention, the reflection clarity is specified as 80% or more in the measurement using the 2.0 mm-width optical comb in order to specify the low level of reflected light component having an excessively large diffusion angle. The above-described four optical combs having widths are defined in JIS K7105. Of these, evaluation using the 0.125 mm-width optical comb having the smallest width and the 2.0 mm-width optical comb having the largest width is conceivable; however, since the use of the 0.125 mm-width optical comb is unreliable and is not suitable for an evaluation index, it was decided to perform evaluation with the 0.5 mm-width optical comb having the second smallest width next to 0.125 mm in JIS K7105 and the 2.0 mm-width optical comb having the largest width in the present invention.

In the concavo-convex surface 62A of the functional layer 62, assuming that, in a cross section along the normal direction N of a film plane of the optical film 60, the slope angle of the concavo-convex surface 62A with respect to the film plane is a surface angle, the rate of a region in which the surface angle is 0.05° or more is preferably 50% or more. The rate of the region in which the surface angle is 0.05° or more is allowed to be 50% or more, whereby interference fringes can be more suppressed from being generated. The lower limit of the rate of the region in which the surface angle is 0.05° or more is preferably 55% or more, more preferably 60% or more. Further, the upper limit of the rate of the region in which the surface angle is 0.05° or more is preferably 95% or less, more preferably 90% or less. A surface angle is obtained by measuring the surface geometry of the concavo-convex surface 62A of the functional layer 62 using the same apparatus as in the first embodiment.

The root mean square slope RΔq of a roughness curve is preferably 0.003 or less on the concavo-convex surface 62A of the functional layer 62. The root mean square slope RΔq of a roughness curve is allowed to be 0.003 or less, whereby cloudiness can be more reduced to enable an optical film having surface glossiness to be obtained. The lower limit of RΔq is preferably 0.0005 or more, more preferably 0.001 or more. Further, the upper limit of RΔq is preferably 0.0025 or less, more preferably 0.002 or less. The root mean square slope RΔq of a roughness curve is obtained by measuring the surface geometry of the concavo-convex surface 62A in the same manner as in the first embodiment.

It is preferable that in a state in which the concavo-convex surface 62A of the functional layer 62 is irradiated with parallel light travelling in a direction sloped at 10° with respect to a normal direction N of the optical film 60, in the angle distribution of reflected light intensities measured in a plane including both directions of the normal direction N and the travelling direction T of the parallel light, a value obtained by subtracting a width of an angle region, in which a reflected light intensity that is not less than ½ of a maximum reflected light intensity is measured, from a width of an angle region, in which a reflected light intensity that is not less than 1/100 of the maximum reflected light intensity is measured, is 0.7° or more and 1.4° or less on the concavo-convex surface 62A of the functional layer 62 by the same reason as the reason explained in the first embodiment. The angle distribution of reflected light intensities can be measured with a known variable angle photometer (goniophotometer), as explained in the first embodiment.

The lower limit of the value obtained by subtracting the ½ angle width from the 1/100 angle width is preferably 0.8° or more, more preferably 0.9° or more. Further, the upper limit of the value obtained by subtracting the ½ angle width from the 1/100 angle width is preferably 1.3° or less, more preferably 1.2° or less.

In the concavo-convex surface 62A of the functional layer 62, the average spacing Sm of the concavities and convexities that constitute the concavo-convex surface 62A is preferably 0.20 mm or more and 0.60 mm or less, more preferably 0.22 mm or more and 0.50 mm or less. In the concavo-convex surface 62A of the functional layer 62, the average slope angle θa of the concavities and convexities that constitute the concavo-convex surface 62A is preferably 0.01° or more and 0.1° or less, more preferably 0.04° or more and 0.08° or less.

In the concavo-convex surface 62A of the functional layer 62, the arithmetic mean roughness Ra of the concavities and convexities that constitute the concavo-convex surface 62A is preferably 0.02 μm or more and 0.10 μm or less, more preferably 0.04 μm or more and 0.08 μm or less. In the concavo-convex surface 62A of the functional layer 62, the maximum height roughness Ry of the concavities and convexities that constitute the concavo-convex surface 62A is preferably 0.20 μm or more and 0.60 μm or less, more preferably 0.25 μm or more and 0.40 μm or less. In the concavo-convex surface 62A of the functional layer 62, the ten-point average roughness Rz of the concavities and convexities that constitute the concavo-convex surface 62A is preferably 0.15 μm or more and 0.50 μm or less, more preferably 0.18 μm or more and 0.30 μm or less.

The definitions of "Sm", "Ra", "Ry", and "Rz" described above are as described in the first embodiment. Further, Sm, θa, Ra, Ry, and Rz can be measured with the same surface roughness measuring instrument (model number: SE-3400, manufactured by Kosaka Laboratory Ltd.) as that in the first embodiment under the measurement conditions described in the first embodiment.

When the functional layer 62 is a hard coat layer as described in accordance with the present embodiment, the hard coat layer preferably has a thickness of 2.0 μm or more and 7.0 μm or less. When the thickness of the hard coat layer is within this range, desired hardness can be obtained. Further, while the hard coat layer can be thinned, the occurrence of cracking or curl of the hard coat layer can be suppressed. The thickness of the hard coat layer can be measured by microscopic observation of its cross section. The lower limit of the thickness of the hard coat layer is more preferably 3 μm or more and the upper limit thereof is more preferably 5 μm or less.

In accordance with the present invention, when the reflection clarity of the concavo-convex surface, measured using the 0.5 mm-width optical comb, is 90% or less (requirement 1) and the reflection clarity of the concavo-convex surface, measured using the 2.0 mm-width optical comb, is 80% or more (requirement 2), interference fringes can be suppressed from being generated, cloudiness is not observed, and a manufacture cost can be reduced. Thus, a material that constitutes the functional layer is not particularly limited as long as the material is appropriately selected to satisfy the requirements 1 and 2. Hereinafter, the concavo-convex surface in which the reflection clarity of the concavo-convex surface, measured using the 0.5 mm-width optical comb, is 90% or less and the reflection clarity of the concavo-convex surface, measured using the 2.0 mm-width optical comb, is 80% or more is referred to as "specific concavo-convex surface".

The specific concavo-convex surface can be obtained by adjusting the sizes of the concavities and convexities present on the concavo-convex surface of the functional layer. The functional layer 62 having the specific concavo-convex surface can be formed by, for example, by the methods (1) to (3) explained in the first embodiment; and the like. Among them, the method (1) is preferred since production is easy.

In the above-described method (1), when the photopolymerizable compound is polymerized (crosslinked) to become the binder resin, shrinkage as a whole occurs since the photopolymerizable compound effects shrinkage on curing in a portion in which any fine particles are not present. In contrast, only the photopolymerizable compound existing above or below the fine particles effects shrinkage on curing since the fine particles do not effect shrinkage on curing in a portion in which the fine particles are present. As a result, the film thickness of the functional layer in the portion in which the fine particles are present is larger than that in the portion in which any fine particles are not present and, therefore, the surface of the functional layer has a concavo-convex geometry. Thus, the functional layer 62 having the specific concavo-convex surface 62A can be formed by appropriately selecting the kind and particle diameters of the fine particles and the kind of the photopolymerizable compound to adjust film formation conditions.

An example in which the functional layer 62 as a hard coat layer contains fine particles and a binder resin will be described below. For example, such a functional layer 62 containing fine particles and a binder resin can be formed by the above-described method (1).

(Fine Particles)

Although the fine particles may be inorganic fine particles or organic fine particles, among them, the inorganic oxide fine particles such as silica ($SiO_2$) fine particles, alumina fine particles, titania fine particles, tin oxide fine particles, antimony-dope tin oxide (abbreviated name: ATO) fine particles, and zinc oxide fine particles are preferred. The inorganic oxide fine particles can form aggregates in the functional layer and a specific concavo-convex surface 62A can be formed depending on the degree of the aggregation of the aggregates.

Examples of the organic fine particles may include plastic beads. Specific examples of the plastic beads include the same plastic beads as described in the first embodiment.

In the above-mentioned shrinkage on curing, the organic fine particles preferably have the moderately adjusted resistance to the shrinkage on curing, of the fine particles. In order to adjust the resistance to the shrinkage, it is preferable to previously make a plurality of optical films containing organic fine particles made to have the varying degrees of three-dimensional crosslinking and having different hardnesses and to select the degree of crosslinking suitable for a specific concavo-convex surface by evaluating the concavo-convex surface of the optical film.

In order to use inorganic oxide particles as fine particles, the inorganic oxide particles are preferably subjected to surface treatment. By subjecting the inorganic oxide fine particles to the surface treatment, distribution of the fine particles in a functional layer 62 can be preferably controlled and the chemical resistance and saponification resistance of the fine particles in themselves can also be improved.

As the surface treatment, hydrophobization treatment in which the surfaces of fine particles are imparted with hydrophobicity is preferable. Such hydrophobization treatment can be obtained by chemically reacting the surfaces of fine particles with a surface treatment agent such as a silane or a silazane. Specific examples of the surface treatment agent include dimethyldichlorosilane, silicone oil, hexamethyldisilazane, octylsilane, hexadecylsilane, aminosilane, methacrylsilane, octa methylcyclotetrasiloxane, polydimethylsiloxane, and the like. When the fine particles are inorganic oxide fine particles, hydroxyl groups are present on the surface of the inorganic oxide fine particles. Such hydrophobization treatment as described above results in reduction in the number of hydroxyl groups present on the surfaces of the inorganic oxide fine particles and in the specific surface area of the inorganic oxide fine particles, measured by the BET method, as well as can result in suppression of excessive aggregation of the inorganic oxide fine particles and in formation of a functional layer having a specific concavo-convex surface.

When inorganic oxide particles are used as the fine particle, the inorganic oxide fine particles are preferably amorphous. This is because, when the inorganic oxide particles are crystalline, a Lewis acid salt of the inorganic oxide fine particles becomes stronger due to lattice defects contained in the crystal structure thereof and the excessive aggregation of the inorganic oxide fine particles might not be controlled.

When inorganic oxide particles are used as the fine particles, the inorganic oxide fine particles preferably form aggregates in the functional layer 62. The aggregates of the inorganic oxide fine particles preferably have a structure, in which the inorganic oxide fine particles are not massive but are three-dimensionally linked, in the functional layer 62. Examples of the structure in which the inorganic oxide fine particles are not massive but are three-dimensionally linked include basket-shaped and coiled structures. That is, the aggregates having the structure in which the inorganic oxide fine particles are not massive but are three-dimensionally linked are easily and homogeneously deformed during shrinkage on curing of a photopolymerizable compound to be a binder resin after curing. As a result, a concavo-convex surface can be made to be a very smooth surface, and the concavo-convex surface does not therefore have a steep slope to allow formation of a functional layer having a specific concavo-convex surface. As mentioned above, a functional layer having a specific concavo-convex surface can be formed by moderately adjusting the degree of cross-linking even when organic fine particles are used.

The content of fine particles with respect to the functional layer 62 is not particularly limited but is preferably 0.1 mass % or more and 5.0 mass % or less. Since the content of the fine particles is 0.1 mass % or more, a specific concavo-convex surface can be more surely formed. Further, since the content of the fine particles is 5.0 mass % or less, aggregates are not excessively generated, internal diffusion and/or generation of large concavities and convexities on the surface of the functional layer can be suppressed, and cloudiness can be therefore suppressed. The lower limit of the content of the fine particles is more preferably 0.5 mass % or more while the upper limit of the content of the fine particles is more preferably 3.0 mass % or less.

The fine particles preferably have spherical shapes in a single-particle state. Such a spherical single particle of the fine particles allows an image excellent in contrast when an optical film is placed on the image display surface of an image display apparatus. As used herein, "spherical shape" means those encompassing, e.g., true-spherical shapes, ellipsoidally spherical shapes, and the like, but not encompassing any so-called indefinite shapes.

When inorganic oxide fine particles are used as the fine particles, the inorganic oxide fine particles preferably have an average primary particle diameter of 1 nm or more and 100 nm or less. The average primary particle diameter of the fine particles of 1 nm or more allows easier formation of a functional layer having a specific concavo-convex surface while the average primary particle diameter of 100 nm or less allows the suppression of the diffusion of light due to the fine particles to provide excellent dark room contrast. The lower limit of the average primary particle diameter of the fine particles is more preferably 5 nm or more while the upper limit of the average primary particle diameter of the fine particles is more preferably 50 nm or less. The average primary particle diameter of the fine particles is a value measured using image processing software from an image by a cross-sectional electron microscope (preferably a transmission electron microscope, such as TEM or STEM, with a magnification of 50000 times or more).

When organic fine particles are used as the fine particle, diffusion of light by the fine particles can be suppressed since a refractive index difference between the organic fine particles and a binder resin can be easily reduced to, e.g., less than 0.01, by changing the copolymerization ratio of the resin having a different refractive index. Therefore, the average primary particle diameter may be less than 8.0 μm, preferably 5.0 μm or less.

When inorganic oxide fine particles are used as the fine particles, the average particle diameter of the aggregates of the inorganic oxide fine particles is preferably 100 nm or more and 2.0 μm or less. A specific concavo-convex surface can be easily formed in the case of 100 nm or more while, in the case of 2.0 μm or less, diffusion of light by the aggregates of the fine particles can be suppressed and an image display apparatus with an optical film excellent in dark room contrast can be obtained. The lower and upper limits of the average particle diameter of the aggregates of the fine particles are preferably 200 nm or more and 1.5 μm or less, respectively. The average particle diameter of the aggregates of the inorganic oxide fine particles is measured by the same method as the method described in the first embodiment.

When silica particles are used as the fine particles, fumed silica fine particles are preferred among silica particles from the viewpoint of allowing easy formation of a functional layer having a specific concavo-convex surface. Examples of commercially available products of fumed silica fine particles include AEROSIL R805, manufactured by Nippon Aerosil Co., Ltd.; and the like.

There are fumed silica fine particles which exhibit hydrophilicity and hydrophobicity. Among them, the fumed silica fine particles that exhibit the hydrophobicity are preferred from the viewpoint of the reduced amount of absorbed water and facilitated dispersion in a composition for a functional layer. A hydrophobic fumed silica can be obtained by chemically reacting silanol groups present on the surfaces of the fumed silica fine particles with such a surface treatment agent as described above. The fumed silica is most preferably subjected to octylsilane treatment from the viewpoint of easily obtaining such an aggregate as described above.

Fumed silica fine particles form aggregates. In a composition for a functional layer, the aggregates of the fumed silica fine particles are not dense aggregates but sufficiently nondense aggregates having shapes such as basket and coiled shapes are formed. Therefore, the aggregates of the fumed silica fine particles are easily and homogeneously deformed during shrinkage on curing of a photopolymerizable compound to be a binder resin after curing. As a result, a functional layer having a specific concavo-convex surface can be formed.

(Binder Resin)

The description of a binder resin is omitted in this embodiment since the binder resin is similar to the binder resin explained in the first embodiment.

(Other Constituents)

In addition, a solvent drying type resin (such as a thermoplastic resin; such a resin as to become a coating only by drying a solvent added to adjust a solid content during coating) or a thermosetting resin may be optionally added to the functional layer 62. The description of the solvent drying type resin is omitted in this embodiment since the solvent drying type resin is similar to the solvent drying type resin explained in the first embodiment.

<<Method for Producing Optical Film>>

A method for producing such an optical film 60 as described above will be described in more detail. In the following description, the functional layer 62 is formed by the above-described method (1).

First, a composition for a functional layer is applied onto the surface of the light transmissive base material 11. Examples of methods for applying a composition for a functional layer include known application methods such as spin coating, dip methods, spray methods, slide coating methods, bar coating methods, roll coating methods, gravure coating methods, and die coating methods.

<Composition for Functional Layer>

A composition for a functional layer contains at least fine particles and a photopolymerizable compound. In addition, the above-described thermoplastic resin, the above-described thermosetting resin, a solvent, or a polymerization initiator may be optionally added to the composition for a functional layer. Further, a dispersing agent, a surfactant, an antistatic agent, a silane coupling agent, a thickener, a coloring inhibitor, a coloring agent (a pigment, a dye), an antifoaming agent, a leveling agent, a flame retardant, an ultraviolet absorbing agent, an adhesion-imparting agent, a polymerization inhibitor, an oxidation inhibitor, a surface modifier, a lubricant, or the like, known in the art, may also be added to the composition for a functional layer depending on a purpose such as increase in the hardness of a functional layer, suppression of shrinkage on curing, or control of a refractive index.

(Solvent, Polymerization Initiator, Leveling Agent)

The description of a solvent, a polymerization initiator, and a leveling agent is omitted in this embodiment since the solvent, the polymerization initiator, and the leveling agent are similar to the solvent, the polymerization initiator, and the leveling agent explained in the first embodiment.

When the mixture region 61A is formed in the vicinity of the interface between the light transmissive base material 61 and the functional layer 62 as illustrated in FIG. 8, the solvent used contains a permeable solvent that has high permeability into the light transmissive base material 61 and dissolves or swells the light transmissive base material 61, and the photopolymerizable compound used contains at least a photopolymerizable monomer having a weight average molecular weight of 1000 or less. By using the permeable solvent and the photopolymerizable monomer, not only the permeable solvent but also the photopolymerizable monomer permeates the light transmissive base material 11 and therefore the mixture region 61A in which the light transmissive base material 61 is mixed with a resin containing the photopolymerizable monomer as a monomer unit can be formed in the vicinity of the interface between the light transmissive base material 61 and the functional layer 62. The description of the permeable solvent is omitted since the permeable solvent is similar to the permeable solvent explained in the first embodiment.

A method for preparing a composition for a functional layer is not particularly limited as long as each constituent can be homogeneously mixed, and the method can be carried out using a known apparatus such as a paint shaker, a bead mill, a kneader, or a mixer.

A composition for a functional layer is applied to the surface of the light transmissive base material 61, followed by being transported to a heated zone to dry the coating film-like composition for a functional layer, and drying the composition for a functional layer by any of various known methods to evaporate a solvent. The state of distribution of the aggregates of fine particles can be adjusted by selecting a solvent relative evaporation rate, solid content concentration, coating liquid temperature, drying temperature, a drying wind velocity, drying time, solvent atmosphere concentration in a drying zone, and the like.

Particularly, the methods of adjusting the state of the distribution of the aggregates of fine particles by selecting drying conditions are simple and preferable. A specific drying temperature of 30 to 120° C. and a drying wind velocity of 0.2 to 50 m/s are preferred. The state of the distribution of the aggregates of the fine particles can be adjusted to a desired state by performing dry treatment, appropriately adjusted in this range, once or several times.

By drying the composition for a functional layer, the photopolymerizable compound remains in the light transmissive base material although the permeable solvent that permeates the light transmissive base material is evaporated.

Then, by irradiating the coating film-like composition for a functional layer with light such as ultraviolet light to polymerize (crosslink) the photopolymerizable compound, the composition for a functional layer is cured to form the functional layer 62 and to form the mixture region 61A.

When ultraviolet light is used as light for curing a composition for a functional layer, there can be used ultraviolet light emitted from ultra-high-pressure mercury lamps, high-pressure mercury lamps, low-pressure mercury lamps, carbon-arc, xenon-arc and metal halide lamps, and the like. Further, a wavelength region of 190 to 380 nm may be used for the wavelength of the ultraviolet light. Specific examples of electron beam sources include various electron beam accelerators such as Cockcroft-Walton accelerators, Van de Graaff accelerators, resonance transformer accelerators, insulated core transformer accelerators, linear accelerators, Dynamitron accelerators, and high-frequency accelerators.

<<Physical Properties of Optical Film>>

The optical film 60 preferably has a total light transmittance of 85% or more. The total light transmittance of 85% or more can result in more improvement in color reproductivity and visibility when the optical film 60 is put on the surface of the image display apparatus. The total light transmittance of 90% or more is preferred. The total light transmittance can be measured by a method according to JIS K7361 using a haze meter (Instrument identification: HM-150, manufactured by MURAKAMI COLOR RESEARCH LABORATORY).

The optical film 60 preferably has a haze value of less than 1%. The haze value of less than 1% can result in desired optical properties and visibility that is more improved when the optical film 60 is placed on an image display surface. The haze value is more preferably 0.5% or less, further preferably 0.3% or less. The haze value can be measured by a method according to JIS K7136 using a haze meter (Instrument identification: HM-150, manufactured by MURAKAMI COLOR RESEARCH LABORATORY).

The optical film 60 preferably has a transmission image clarity of 75% or more and 95% or less with a 0.125 mm-width comb and a transmission image clarity of 95% or more with a 2.0 mm-width comb. The transmission image clarity of 75% or more with a 0.125 mm-width comb can result in more improvement in the clarity of an image to obtain superior image quality when the image is displayed. Further, a transmission image clarity of 95% or less can result in more preferable prevention of any interference fringe. The transmission image clarity with the 0.125 mm-width comb is more preferably 80% or more and 90% or less. Further, a transmission image clarity of 95% or more with the 2.0 mm-width comb can result in more improvement in the clarity of an image and the suppression of cloudiness due to the diffuse reflection of extraneous light. The transmission image clarity can be measured by a method according to a transmission method for image clarity in JIS K7105 using an image clarity measuring device (instrument identification: ICM-1T, manufactured by Suga Test Instruments Co., Ltd.).

The optical film 60 preferably has a contrast ratio of 80% or more, more preferably 90% or more. The contrast ratio of 80% or more can result in excellent dark room contrast and more improved visibility when the optical film 60 is put on the surface of the image display apparatus.

In the present embodiment, the reflection clarity of the concavo-convex surface 62A, measured using a 0.5 mm-width optical comb, is 90% or less, while the reflection clarity of the concavo-convex surface 62A, measured using a 2.0 mm-width optical comb, is 80% or more, and therefore, for the reasons mentioned above, interference fringes can be suppressed from being generated and cloudiness is not observed. Further, since the interference fringes can be suppressed from being generated due to the concavo-convex surface 62A of the functional layer 62, the thickness of the mixture region can be reduced. As a result, the thickness of the functional layer can be reduced to reduce a manufacture cost.

In a conventional antireflection film, light other than regular reflection light and regular transmission light has been considered to deteriorate image quality and therefore the presence of diffused light in itself in the antireflection film has been considered to be negative. For example, even if it was necessary to add fine particles, e.g., in order to improve hard coat properties, materials and manufacture conditions have been selected with an eye only toward preventing diffused light from being generated by aggregating the fine particles to have large particle diameters. That is, a flat surface has been required for the antireflection film in order to obtain a sharp image without cloudiness by prevention of the generation of diffused light, and it has not been possibly conceivable that diffused light is generated. Therefore, when reflection clarity is measured using a 0.5 mm-width optical comb on an antireflection film, the reflection clarity is more than 90% on the antireflection film (see Comparative Example 1 in FIG. 15). In contrast, in a conventional antiglare film, since the prevention of the reflection of an external image is the action in itself of the antiglare film, it is required to surely diffuse an external image reflecting an observer. Therefore, when reflection clarity is measured using a 2.0 mm-width optical comb on the antiglare film, the reflection clarity on the antiglare film is less than 80% (see Comparative Examples 2 and 3 in FIG. 15). Thus, the above-described effects provided by allowing the reflection clarity of the concavo-convex surface, measured using the 0.5 mm-width optical comb, to be 90% or less and the reflection clarity of the concavo-convex surface, measured using the 2.0 mm-width optical comb, to be 80% or more are considered to be remarkable effects beyond an expectable range in light of the technical standards of the conventional antireflection and antiglare films.

<<Polarizing Plate, Liquid Crystal Panel, Image Display Apparatus>>

Figure 10:
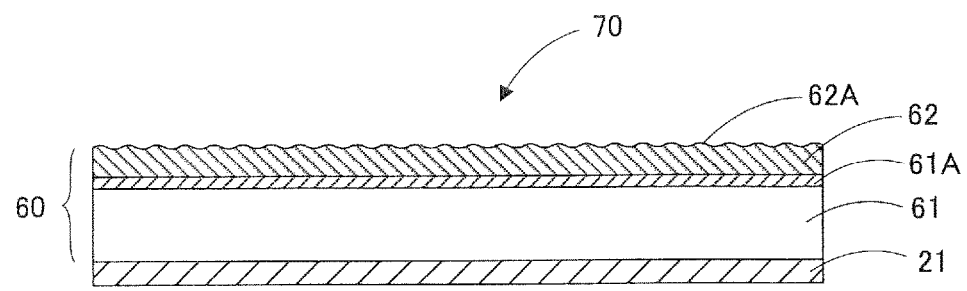
FIG. 10 is a schematic view illustrating the configuration of a polarizing plate according to the third embodiment.
Figure 11:
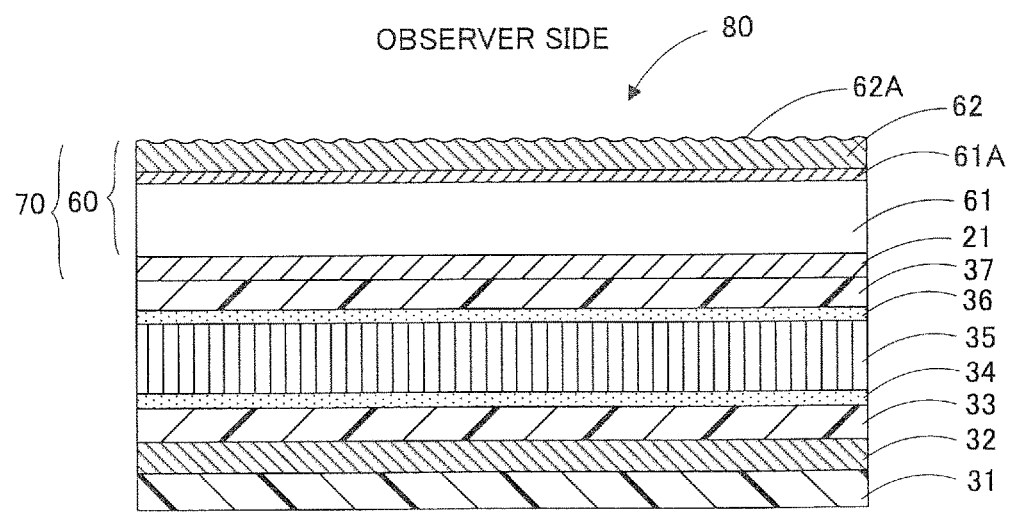
FIG. 11 is a schematic view illustrating the configuration of a liquid crystal panel according to the third embodiment.
Figure 12:
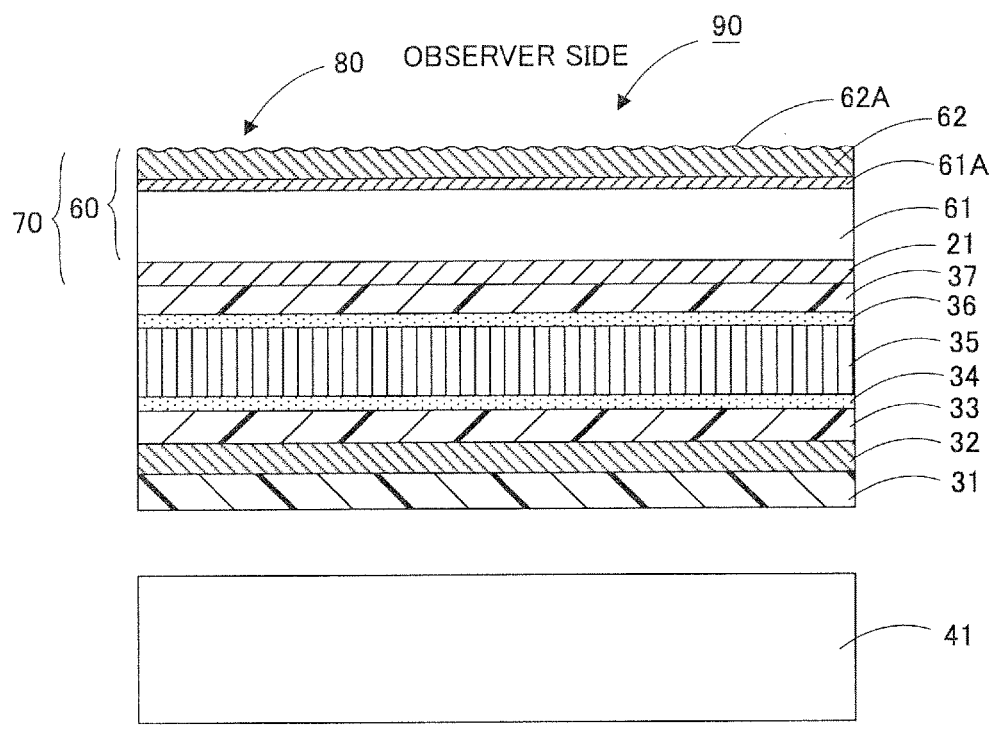
FIG. 12 is a schematic view illustrating the configuration of a liquid crystal display which is an example of an image display apparatus according to the third embodiment.

As illustrated in FIG. 10 to FIG. 12, the optical film 10 incorporated, for example, into a polarizing plate 70, a liquid crystal panel 80, and an image display apparatus 90 can be used in the same manner as in the first embodiment. In FIGS.

10 to 12, members with the same signs as those in FIG. 3 to FIG. 5 mean the same members as the members explained in the first embodiment.

Fourth Embodiment

Figure 13:
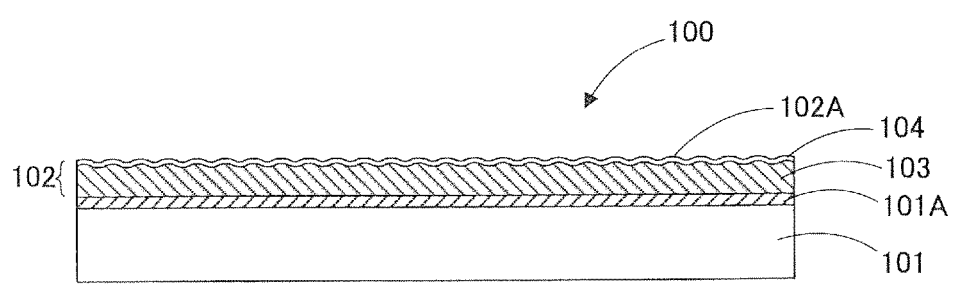
FIG. 13 is a schematic view illustrating the configuration of an optical film according to a fourth embodiment.

Another optical film according to a fourth embodiment of the present invention will be described below with reference to the drawings. FIG. 13 is a schematic view illustrating the configuration of the optical film according to the present embodiment.

<<Optical Film>>

As illustrated in FIG. 13, an optical film 100 includes at least a light transmissive base material 101 and a functional layer 102 disposed on the light transmissive base material 101. The description of the light transmissive base material 101 is omitted in this embodiment since the light transmissive base material 101 is similar to the light transmissive base material 61 described above. In the vicinity of the interface between the light transmissive base material 101 and the functional layer 102 (in the vicinity of the interface between the light transmissive base material 101 and a hard coat layer 103 described below), it is preferable to form a mixture region 101A in which the light transmissive base material 102 and the constituent of the binder resin of the hard coat layer 103 are mixed as illustrated in FIG. 13.

(Functional Layer)

The functional layer 102 is configured by the hard coat layer 103 and a low refractive index layer 104 disposed on the hard coat layer 103. The functional layer 102 has a concavo-convex surface 102A, which forms a surface of the optical film 100, and the concavo-convex surface 102A of the functional layer 102 is a surface of the low refractive index layer 104.

Similarly to the optical film 60, in the optical film 100, the reflection clarity of the concavo-convex surface 102A, measured using a 0.5 mm-width optical comb, is also 90% or less and the reflection clarity of the concavo-convex surface 102A, measured using a 2.0 mm-width optical comb, is also 80% or more. The reflection clarity is measured by the method explained in the third embodiment.

The upper limit of the reflection clarity measured using a 0.5 mm-width optical comb is preferably 80% or less, more preferably 70% or less. Further, the lower limit of the reflection clarity measured using a 0.5 mm-width optical comb is preferably 10% or more, more preferably 20% or more.

The lower limit of the reflection clarity measured using a 2.0 mm-width optical comb is preferably 85% or more, more preferably 90% or more. Further, the upper limit of the reflection clarity measured using a 2.0 mm-width optical comb is preferably 100% or less, more preferably 95% or less.

Further, the rate of a region in which a surface angle is 0.05° or more, RΔq, value obtained by subtracting a ½ angle width from a 1/100 angle width, Sm, θa, Ra, Ry, and Rz of the concavo-convex surface 102A of the functional layer 102 are preferably similar to those of the concavo-convex surface 102A of the functional layer 102.

(Hard Coat Layer)

The description of the hard coat layer 103 is omitted in the present embodiment since the hard coat layer 103 is similar to the functional layer 62. However, unlike the functional layer 102, in the surface of the hard coat layer 103, it is not necessary that the reflection clarity measured using a 0.5 mm-width optical comb is 90% or less and the reflection clarity measured using a 2.0 mm-width optical comb is 80% or more.

(Low Refractive Index Layer)

The description of the low refractive index layer 104 is omitted in this embodiment since the low refractive index layer 104 is similar to the low refractive index layer 54 described in the first embodiment.

In accordance with the present embodiment, the reflection clarity of the concavo-convex surface 102A, measured using a 0.5 mm-width optical comb, is 90% or less while the reflection clarity of the concavo-convex surface 102A, measured using a 2.0 mm-width optical comb, is 80% or more, and therefore, interference fringes can be suppressed from being generated, cloudiness is not observed, and a manufacture cost can be reduced, as explained in the first embodiment.

EXAMPLES

The present invention will be described below with reference to examples in order to describe the present invention in detail but the present invention is not limited to the description thereof.

Example A

Preparation of Composition for Hard Coat Layer

First, each constituent was blended so as to have the following composition to obtain a composition for a hard coat layer.

(Composition A1 for Hard Coat Layer)

Fumed silica (octylsilane treatment, average particle diameter of 12 nm, manufactured by Nippon Aerosil Co., Ltd.): 1 part by mass Pentaerythritol tetraacrylate (PETTA) (product name: PETA, manufactured by Daicel-Cytec Company, Ltd.): 60 parts by mass Urethane acrylate (product name: UV1700B, manufactured by The Nippon Synthetic Chemical Industry Co., Ltd., weight average molecular weight: 2000, number of functional group: 10): 40 parts by mass Polymerization initiator (IRGACURE 184, manufactured by BASF Japan Ltd.): 5 parts by mass Polyether-modified silicone (product name: TSF4460, manufactured by Momentive Performance Materials Inc.): 0.025 part by mass Toluene: 105 parts by mass Isopropyl alcohol: 30 parts by mass Cyclohexanone: 15 parts by mass The above-described fumed silica was subjected to octylsilane treatment (treatment of substituting a silanol group on the surface of the fumed silica with an octylsilyl group by octylsilane to perform hydrophobization).

(Composition A2 for Hard Coat Layer)

Fumed silica (octylsilane treatment, average particle diameter of 12 nm, manufactured by Nippon Aerosil Co., Ltd.) 1.5 parts by mass Pentaerythritol tetraacrylate (PETTA) (product name: PETA, manufactured by Daicel-Cytec Company, Ltd.): 60 parts by mass Urethane acrylate (product name: UV1700B, manufactured by The Nippon Synthetic Chemical Industry Co., Ltd., weight average molecular weight: 2000, number of functional group: 10): 40 parts by mass Polymerization initiator (IRGACURE 184, manufactured by BASF Japan Ltd.): 5 parts by mass Polyether-modified silicone (TSF4460, manufactured by Momentive Performance Materials Inc.): 0.025 part by mass Toluene: 105 parts by mass Isopropyl alcohol: 30 parts by mass Cyclohexanone: 15 parts by mass (Composition A3 for Hard Coat Layer)

Fumed silica (octylsilane treatment, average particle diameter of 12 nm, manufactured by Nippon Aerosil Co., Ltd.): 0.5 part by mass Pentaerythritol tetraacrylate (PETTA) (product name: PETA, manufactured by Daicel-Cytec Company, Ltd.): 60 parts by mass Urethane acrylate (product name: UV1700B, manufactured by The Nippon Synthetic Chemical Industry Co., Ltd., weight average molecular weight: 2000, number of functional group: 10): 40 parts by mass Polymerization initiator (IRGACURE 184, manufactured by BASF Japan Ltd.): 5 parts by mass Polyether-modified silicone (product name: TSF4460, manufactured by Momentive Performance Materials Inc.): 0.025 part by mass Toluene: 105 parts by mass Isopropyl alcohol: 30 parts by mass Cyclohexanone: 15 parts by mass (Composition A4 for Hard Coat Layer)

Pentaerythritol tetraacrylate (PETTA) (product name: PETA, manufactured by Daicel-Cytec Company, Ltd.): 60 parts by mass Urethane acrylate (product name: UV1700B, manufactured by The Nippon Synthetic Chemical Industry Co., Ltd., weight average molecular weight: 2000, number of functional group: 10): 40 parts by mass Polymerization initiator (IRGACURE 184, manufactured by BASF Japan Ltd.): 5 parts by mass Polyether-modified silicone (TSF4460, manufactured by Momentive Performance Materials Inc.): 0.025 part by mass Toluene: 105 parts by mass Isopropyl alcohol: 30 parts by mass Cyclohexanone: 15 parts by mass (Composition A5 for Hard Coat Layer)

Organic fine particles (hydrophilization-treated acryl-styrene copolymer particles, average particle diameter of 2.0 µm, refractive index of 1.515, manufactured by Sekisui Plastics Co., Ltd.): 3 parts by mass Fumed silica (methylsilane treatment, average particle diameter of 12 nm, manufactured by Nippon Aerosil Co., Ltd.) 1 part by mass Pentaerythritol tetraacrylate (PETTA) (product name: PETA, manufactured by Daicel-Cytec Company, Ltd.): 60 parts by mass Urethane acrylate (product name: UV1700B, manufactured by The Nippon Synthetic Chemical Industry Co., Ltd., weight average molecular weight: 2000, number of functional group: 10): 40 parts by mass Polymerization initiator (IRGACURE 184, manufactured by BASF Japan Ltd.): 5 parts by mass Polyether-modified silicone (TSF4460, manufactured by Momentive Performance Materials Inc.): 0.025 part by mass Toluene: 105 parts by mass Isopropyl alcohol: 30 parts by mass Cyclohexanone: 15 parts by mass (Composition A6 for Hard Coat Layer)

Organic fine particles (hydrophilization-treated acryl-styrene copolymer particles, average particle diameter of 2.0 µm, refractive index of 1.55, manufactured by Sekisui Plastics Co., Ltd.): 3 parts by mass Fumed silica (methylsilane treatment, average particle diameter of 12 nm, manufactured by Nippon Aerosil Co., Ltd.) 1 part by mass Pentaerythritol tetraacrylate (PETTA) (product name: PETA, manufactured by Daicel-Cytec Company, Ltd.): 60 parts by mass Urethane acrylate (product name: UV1700B, manufactured by The Nippon Synthetic Chemical Industry Co., Ltd., weight average molecular weight: 2000, number of functional group: 10): 40 parts by mass Polymerization initiator (IRGACURE 184, manufactured by BASF Japan Ltd.): 5 parts by mass Polyether-modified silicone (TSF4460, manufactured by Momentive Performance Materials Inc.): 0.025 part by mass Toluene: 105 parts by mass Isopropyl alcohol: 30 parts by mass Cyclohexanone: 15 parts by mass (Composition A7 for Hard Coat Layer)

Organic fine particles (non-hydrophilization-treated acryl-styrene copolymer particles, average particle diameter of 3.5 µm, refractive index of 1.55, manufactured by Sekisui Plastics Co., Ltd.): 8 parts by mass Pentaerythritol triacrylate (PETA) (product name: PETIA, manufactured by Daicel-Cytec Company, Ltd.): 80 parts by mass Isocyanuric acid EO-modified triacrylate (product name: M-315, manufactured by Toagosei Co., Ltd.): 20 parts by mass Polymerization initiator (IRGACURE 184, manufactured by BASF Japan Ltd.): 5 parts by mass Polyether-modified silicone (TSF4460, manufactured by Momentive Performance Materials Inc.): 0.025 part by mass Toluene: 120 parts by mass Cyclohexanone: 30 parts by mass <Preparation of Composition for Low Refractive Index Layer>

Each constituent was blended so as to have the following composition to obtain a composition for a low refractive index layer.

(Composition for Low Refractive Index Layer)

Hollow silica fine particles (solid content of hollow silica fine particle: 20 mass %, solution: methyl isobutyl ketone, average particle diameter: 50 nm): 40 parts by mass Pentaerythritol triacrylate (PETA) (product name: PETIA, manufactured by Daicel-Cytec Company, Ltd.): 10 parts by mass Polymerization initiator (IRGACURE 127, manufactured by BASF Japan Ltd.): 0.35 part by mass Modified silicone oil (X22164E; manufactured by Shin-Etsu Chemical Co., Ltd.): 0.5 part by mass Methyl isobutyl ketone (MIBK): 320 parts by mass Propylene glycol monomethyl ether acetate (PGMEA): 161 parts by mass Example A1

A triacetylcellulose resin film (TD60UL, manufactured by Fujifilm Corporation) with a thickness of 60 µm as a light transmissive base material was prepared and the composition 1 for a hard coat layer was applied to one surface of the triacetylcellulose resin film to form a coating film. Then, a solvent in the coating film was evaporated by circulating dry air at 70° C. to the formed coating film at a flow rate of 0.2 m/s for 15 seconds and thereafter further circulating dry air at 70° C. at a flow rate of 10 m/s for 30 seconds to dry the coating film, and a hard coat layer of 4 µm in thickness (when cured) was formed to produce an optical film according to Example A1 by irradiating the coating film with ultraviolet light under nitrogen atmosphere (oxygen concentration of 200 ppm or less) so that the integrated amount of light is 100 mJ/cm² to cure the coating film.

Example A2

In Example A2, an optical film was produced in the same manner as in Example A1 except that the composition 2 for a hard coat layer was used instead of the composition 1 for a hard coat layer.

Example A3

In Example A3, a hard coat layer was formed on a triacetylcellulose resin film in the same manner as in Example 1 except that the integrated amount of ultraviolet light was 50 mJ/cm². Then, a composition for a low refractive index layer was applied to a surface of the hard coat layer so as to have a film thickness of 0.1 µm after dried (40° C.×1 min) and was cured by ultraviolet irradiation at the integrated amount of light of 100 mJ/cm² under nitrogen atmosphere (oxygen concentration of 200 ppm or less) to form a low refractive index layer to produce an optical film according to Example A3.

Example A4

In Example A4, an optical film was produced in the same manner as in Example A3 except that the composition 2 for a hard coat layer was used instead of the composition 1 for a hard coat layer.

Example A5

In Example A5, an optical film was produced in the same manner as in Example A1 except that the composition 3 for a hard coat layer was used instead of the composition 1 for a hard coat layer.

Comparative Example A1

In Comparative Example A1, an optical film was produced in the same manner as in Example A1 except that the composition 4 for a hard coat layer was used instead of the composition 1 for a hard coat layer.

Comparative Example A2

In Comparative Example A2, an optical film was produced in the same manner as in Example A3 except that the composition 5 for a hard coat layer was used instead of the composition 1 for a hard coat layer.

Comparative Example A3

In Comparative Example A3, an optical film was produced in the same manner as in Example A1 except that the composition 6 for a hard coat layer was used instead of the composition 1 for a hard coat layer.

Comparative Example A4

In Comparative Example A4, an optical film was produced in the same manner as in Example A1 except that the composition 7 for a hard coat layer was used instead of the composition 1 for a hard coat layer and the film thickness of a cured hard coat layer was 5 µm.

<Measurement of Angle Distribution of Reflected Light Intensities>

A black acrylic sheet for preventing back surface reflection was affixed through a transparent pressure sensitive adhesive to the surface opposite to the other surface, on which the hard coat layer was formed, of the triacetylcellulose resin film of each optical film obtained in Examples A1 to A5 and Comparative Examples A1 to A4, to make a sample. The sample was put in a variable angle photometer (model number: GP-200, manufactured by MURAKAMI COLOR RESEARCH LABORATORY) so that the hard coat layer or low refractive index layer side thereof was directed toward a light source, and the angle distribution of reflected light intensities was measured under the following conditions:

Incidence angle: 10°
Tilt angle: 0°
Light receiving range: 5° to 15° (regular reflection direction) ±5°, data spacing: 0.1°
VS1 (light flux diaphragm): 0.5
VS3 (light receiving diaphragm): 4.0

Figure 14:
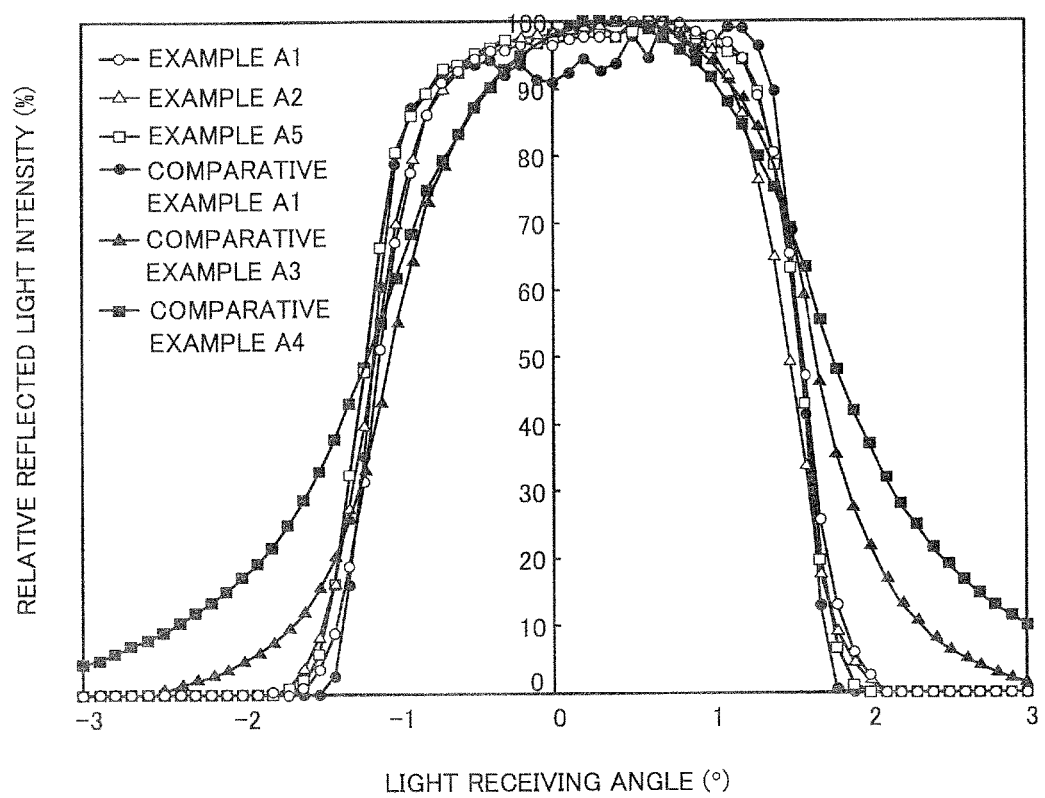
FIG. 14 is a graph representing the angle distributions of reflected light intensities in optical films according to Examples A1, A2, and A5 as well as Comparative Examples A1, A3, and A4.

FIG. 14 is a graph representing the angle distributions of the reflected light intensities in the optical films according to Examples A1, A2, and A5 as well as Comparative Examples A1, A3, and A4.

In addition, $\frac{1}{100}$ angle widths and $\frac{1}{2}$ angle widths were determined using the obtained angle distributions of the reflection intensities, and values obtained by subtracting the $\frac{1}{2}$ angle widths from the $\frac{1}{100}$ angle widths were determined.

<Measurement of Surface Angle and Root Mean Square Slope RΔq>

A glass plate was affixed through a transparent pressure sensitive adhesive to the surface opposite to the other surface, on which the hard coat layer is formed, of each optical film obtained in Examples and Comparative Examples, to make a sample, and the surface shape of the optical film was measured and analyzed using a white light interference microscope (New View 6300, manufactured by Zygo Corporation) under the following conditions. As analysis software, Microscope Application of MetroPro ver 8.3.2 was used.

[Measurement Conditions]
Objective lens: 2.5 times
Zoom: 2 times
Number of data points: 992×992 points
Resolution (spacing per point): 2.2 µm

[Analysis Conditions]
Removed: None
Filter: High Pass
Filter Type Gauss Spline
Low wavelength: 300 µm A concavo-convex shape in which waviness components are removed by a high-pass filter with a cutoff value of 300 µm is obtained on the above-mentioned conditions.

Remove spikes: on
Spike Height (xRMS): 2.5

Spike-like noises can be removed on the above-mentioned conditions.

Then, a SlopeX MAP image (display of slope in x direction) was displayed to display rms with the above-described analysis software (MetroPro ver 8.3.2-Microscope Application). This rms corresponds to a root mean square slope RΔq.

A slope $\Delta i$ at each point was determined over the whole surface, the slope $\Delta i$ was converted into a surface angle $\theta i$ from the above-described expression (3), and the rate of a region in which the absolute value of the surface angle $\theta i$ was 0.05° or more was thus calculated.

<Measurement of Sm, $\theta a$, Ra, Ry, and Rz>

Sm, $\theta a$, Ra, Ry, and Rz were measured on a surface (a surface of a hard coat layer in the absence of a low refractive index layer or a surface of a low refractive index layer in the presence of a low refractive index layer) of each optical film obtained in Examples A1 to A5 and Comparative Examples A1 to A4. The definitions of Sm, Ra, Ry, and Rz should comply with JIS B0601-1994, and $\theta a$ should comply with the instruction manual (revised on Jul. 20, 1995) of a surface roughness measuring instrument: SE-3400, manufactured by Kosaka Laboratory Ltd.

Specifically, Sm, $\theta a$, Ra, Ry, and Rz were measured using a surface roughness measuring instrument (model number:

Excellent: No interference fringe was confirmed.

Good: A few interference fringes were confirmed but were at a level without any problem.

Poor: Interference fringes were confirmed clearly.

<Cloudiness Observation Evaluation>

A black acrylic sheet was affixed through a transparent pressure sensitive adhesive to the surface opposite to the other surface, on which the hard coat layer was formed, of the triacetylcellulose resin film of each optical film obtained in Examples A1 to A5 and Comparative Examples A1 to A4, and cloudiness was observed under a table lamp (three-wavelength fluorescent lamp) in a dark room and evaluated based on the following criteria:

Good: No whiteness was observed.

Poor: Whiteness was observed.

The results are listed in Table 1 below.

TABLE 1

|  | Composition for Hard Coat Layer | Low Refractive Index Layer | 1/100 Angle Width-1/2 Angle Width (°) | Rate (%) of Region with Surface Angle of 0.05° or More | R$\Delta$q | Sm (mm) | $\theta a$ (°) | Ra (µm) | Ry (µm) | Rz (µm) | Interference Fringes | Cloudiness |
|---|---|---|---|---|---|---|---|---|---|---|---|---|
| Example A1 | A1 | Absent | 0.9 | 60.3 | 0.0024 | 0.270 | 0.054 | 0.049 | 0.323 | 0.257 | Excellent | Good |
| Example A2 | A2 | Absent | 1.1 | 65.5 | 0.0026 | 0.429 | 0.057 | 0.061 | 0.328 | 0.288 | Excellent | Good |
| Example A3 | A1 | Present | 0.9 | 59.0 | 0.0018 | 0.295 | 0.052 | 0.048 | 0.286 | 0.227 | Excellent | Good |
| Example A4 | A2 | Present | 1.1 | 63.2 | 0.0020 | 0.466 | 0.053 | 0.060 | 0.318 | 0.254 | Excellent | Good |
| Example A5 | A3 | Absent | 0.8 | 54.3 | 0.0020 | 0.222 | 0.025 | 0.039 | 0.271 | 0.208 | Good | Good |
| Comparative Example A1 | A4 | Absent | 0.5 | 1.2 | 0.0003 | 0.188 | 0.008 | 0.029 | 0.165 | 0.123 | Poor | Good |
| Comparative Example A2 | A5 | Present | 1.5 | 72.3 | 0.0035 | 0.247 | 0.094 | 0.060 | 0.420 | 0.298 | Excellent | Poor |
| Comparative Example A3 | A6 | Absent | 2.8 | 81.0 | 0.0085 | 0.216 | 0.205 | 0.083 | 0.649 | 0.494 | Excellent | Poor |
| Comparative Example A4 | A7 | Absent | 4.8 | 93.9 | 0.0188 | 0.202 | 0.601 | 0.128 | 0.872 | 0.639 | Excellent | Poor |

SE-3400, manufactured by Kosaka Laboratory Ltd.) under the following measurement conditions:

1) Tracer in Surface Roughness Detector (trade name: SE2555N (standard 2 µm), manufactured by Kosaka Laboratory Ltd.)

Radius of curvature in tip: 2 µm, apex angle: 90 degrees, material: diamond

2) Measurement Conditions for Surface Roughness Measuring Instrument

Reference length (cutoff value $\lambda c$ of roughness curve): 2.5 mm

Evaluation length (reference length (cutoff value $\lambda c$)×5): 12.5 mm

Feed speed of tracer: 0.5 mm/sec

Preliminary length: (cutoff value $\lambda c$)×2

Longitudinal magnification: 2000 times

Lateral magnification: 10 times

<Interference Fringe Observation Evaluation>

A black acrylic sheet for preventing back surface reflection was affixed through a transparent pressure sensitive adhesive to the surface opposite to the other surface, on which the hard coat layer was formed, of the triacetylcellulose resin film of each optical film obtained in Examples A1 to A5 and Comparative Examples A1 to A4, each optical film was irradiated with light from a hard coat layer or low refractive index layer side, and visual observation was carried out. An interference fringe inspection lamp (sodium lamp) manufactured by Funatech Co., Ltd. was used as a light source. Generation of interference fringes was evaluated based on the following criteria:

As indicated in Table 1, in Comparative Examples A1 to A4, either of an interference fringe or cloudiness was observed since the requirement that a value obtained by subtracting a ½ angle width from a 1/100 angle width is 0.7° or more and 1.4° or less was not satisfied. In contrast, as indicated in Table 1, in Examples A1 to A5, no interference fringe was confirmed or a few interference fringes were confirmed but were at a level without any problem and no cloudiness was observed since the requirement that a value obtained by subtracting a ½ angle width from a 1/100 angle width is 0.7° or more and 1.4° or less was satisfied.

Example B

Preparation of Composition for Hard Coat Layer

First, each constituent was blended so as to have the following composition to obtain a composition for a hard coat layer.

(Composition B1 for Hard Coat Layer)

Fumed silica (octylsilane treatment, average particle diameter of 12 nm, manufactured by Nippon Aerosil Co., Ltd.): 1 part by mass Pentaerythritol tetraacrylate (PETTA) (product name: PETA, manufactured by Daicel-Cytec Company, Ltd.): 60 parts by mass Urethane acrylate (product name: UV1700B, manufactured by The Nippon Synthetic Chemical Industry Co., Ltd., weight average molecular weight: 2000, number of functional group: 10): 40 parts by mass Polymerization initiator (IRGACURE 184, manufactured by BASF Japan Ltd.): 5 parts by mass Polyether-modified silicone (product name: TSF4460, manufactured by Momentive Performance Materials Inc.): 0.025 part by mass Toluene: 105 parts by mass
Isopropyl alcohol: 30 parts by mass
Cyclohexanone: 15 parts by mass The above-described fumed silica was subjected to octylsilane treatment (treatment of substituting a silanol group on the surface of the fumed silica with an octylsilyl group by octylsilane to perform hydrophobization).

(Composition B2 for Hard Coat Layer)

Fumed silica (octylsilane treatment, average particle diameter of 12 nm, manufactured by Nippon Aerosil Co., Ltd.) 1.5 parts by mass Pentaerythritol tetraacrylate (PETTA) (product name: PETA, manufactured by Daicel-Cytec Company, Ltd.): 60 parts by mass Urethane acrylate (product name: UV1700B, manufactured by The Nippon Synthetic Chemical Industry Co., Ltd., weight average molecular weight: 2000, number of functional group: 10): 40 parts by mass Polymerization initiator (IRGACURE 184, manufactured by BASF Japan Ltd.): 5 parts by mass Polyether-modified silicone (TSF4460, manufactured by Momentive Performance Materials Inc.): 0.025 part by mass Toluene: 105 parts by mass
Isopropyl alcohol: 30 parts by mass
Cyclohexanone: 15 parts by mass (Composition B3 for Hard Coat Layer)

Fumed silica (octylsilane treatment, average particle diameter of 12 nm, manufactured by Nippon Aerosil Co., Ltd.): 0.5 part by mass Pentaerythritol tetraacrylate (PETTA) (product name: PETA, manufactured by Daicel-Cytec Company, Ltd.): 60 parts by mass Urethane acrylate (product name: UV1700B, manufactured by The Nippon Synthetic Chemical Industry Co., Ltd., weight average molecular weight: 2000, number of functional group: 10): 40 parts by mass Polymerization initiator (IRGACURE 184, manufactured by BASF Japan Ltd.): 5 parts by mass Polyether-modified silicone (product name: TSF4460, manufactured by Momentive Performance Materials Inc.): 0.025 part by mass Toluene: 105 parts by mass
Isopropyl alcohol: 30 parts by mass
Cyclohexanone: 15 parts by mass (Composition B4 for Hard Coat Layer)

Pentaerythritol tetraacrylate (PETTA) (product name: PETA, manufactured by Daicel-Cytec Company, Ltd.): 60 parts by mass Urethane acrylate (product name: UV1700B, manufactured by The Nippon Synthetic Chemical Industry Co., Ltd., weight average molecular weight: 2000, number of functional group: 10): 40 parts by mass Polymerization initiator (IRGACURE 184, manufactured by BASF Japan Ltd.): 5 parts by mass Polyether-modified silicone (TSF4460, manufactured by Momentive Performance Materials Inc.): 0.025 part by mass Toluene: 105 parts by mass
Isopropyl alcohol: 30 parts by mass
Cyclohexanone: 15 parts by mass (Composition B5 for Hard Coat Layer)

Organic fine particles (hydrophilization-treated acryl-styrene copolymer particles, average particle diameter of 2.0 µm, refractive index of 1.55, manufactured by Sekisui Plastics Co., Ltd.): 3 parts by mass Fumed silica (methylsilane treatment, average particle diameter of 12 nm, manufactured by Nippon Aerosil Co., Ltd.) 1 part by mass Pentaerythritol tetraacrylate (PETTA) (product name: PETA, manufactured by Daicel-Cytec Company, Ltd.): 60 parts by mass Urethane acrylate (product name: UV1700B, manufactured by The Nippon Synthetic Chemical Industry Co., Ltd., weight average molecular weight: 2000, number of functional group: 10): 40 parts by mass Polymerization initiator (IRGACURE 184, manufactured by BASF Japan Ltd.): 5 parts by mass Polyether-modified silicone (TSF4460, manufactured by Momentive Performance Materials Inc.): 0.025 part by mass Toluene: 105 parts by mass
Isopropyl alcohol: 30 parts by mass
Cyclohexanone: 15 parts by mass (Composition B6 for Hard Coat Layer)

Organic fine particles (non-hydrophilization-treated acryl-styrene copolymer particles, average particle diameter of 3.5 µm, refractive index of 1.55, manufactured by Sekisui Plastics Co., Ltd.): 8 parts by mass Pentaerythritol triacrylate (PETA) (product name: PETIA, manufactured by Daicel-Cytec Company, Ltd.): 80 parts by mass Isocyanuric acid EO-modified triacrylate (product name: M-315, manufactured by Toagosei Co., Ltd.): 20 parts by mass Polymerization initiator (IRGACURE 184, manufactured by BASF Japan Ltd.): 5 parts by mass Polyether-modified silicone (TSF4460, manufactured by Momentive Performance Materials Inc.): 0.025 part by mass Toluene: 120 parts by mass
Cyclohexanone: 30 parts by mass <Preparation of Composition for Low Refractive Index Layer>

Each constituent was blended so as to have the following composition to obtain a composition for a low refractive index layer.

(Composition for Low Refractive Index Layer)

Hollow silica fine particles (solid content of hollow silica fine particle: 20 mass %, solution: methyl isobutyl ketone, average particle diameter: 50 nm): 40 parts by mass Pentaerythritol triacrylate (PETA) (product name: PETIA, manufactured by Daicel-Cytec Company, Ltd.): 10 parts by mass Polymerization initiator (IRGACURE 127, manufactured by BASF Japan Ltd.): 0.35 part by mass Modified silicone oil (X22164E; manufactured by Shin-Etsu Chemical Co., Ltd.): 0.5 part by mass Methyl isobutyl ketone (MIBK): 320 parts by mass Propylene glycol monomethyl ether acetate (PGMEA): 161 parts by mass Example B1

A triacetylcellulose resin film (TD60UL, manufactured by Fujifilm Corporation) with a thickness of 60 µm as a light transmissive base material was prepared and the composition 1 for a hard coat layer was applied to one surface of the triacetylcellulose resin film to form a coating film. Then, a solvent in the coating film was evaporated by circulating dry air at 70° C. to the formed coating film at a flow rate of 0.2 m/s for 15 seconds and thereafter further circulating dry air at 70° C. at a flow rate of 10 m/s for 30 seconds to dry the coating film, and a hard coat layer of 4 µm in thickness (when cured) was formed to produce an optical film according to Example B1 by irradiating the coating film with ultraviolet light under nitrogen atmosphere (oxygen concen-

Example B2

In Example B2, an optical film was produced in the same manner as in Example B1 except that the composition 2 for a hard coat layer was used instead of the composition 1 for a hard coat layer.

Example B3

In Example B3, a hard coat layer was formed on a triacetylcellulose resin film in the same manner as in Example 1 except that the integrated amount of ultraviolet light was 50 mJ/cm². Then, a composition for a low refractive index layer was applied to a surface of the hard coat layer so as to have a film thickness of 0.1 μm after dried (40° C.×1 min) and was cured by ultraviolet irradiation at the integrated amount of light of 100 mJ/cm² under nitrogen atmosphere (oxygen concentration of 200 ppm or less) to form a low refractive index layer to produce an optical film according to Example B3.

Example B4

In Example B4, an optical film was produced in the same manner as in Example B3 except that the composition B2 for a hard coat layer was used instead of the composition B1 for a hard coat layer.

Example B5

In Example B5, an optical film was produced in the same manner as in Example B1 except that the composition B3 for a hard coat layer was used instead of the composition B1 for a hard coat layer.

Comparative Example B1

In Comparative Example B1, an optical film was produced in the same manner as in Example B1 except that the composition B4 for a hard coat layer was used instead of the composition B1 for a hard coat layer.

Comparative Example B2

In Comparative Example B2, an optical film was produced in the same manner as in Example B1 except that the composition B5 for a hard coat layer was used instead of the composition B1 for a hard coat layer.

Comparative Example B3

In Comparative Example B3, an optical film was produced in the same manner as in Example B1 except that the composition B6 for a hard coat layer was used instead of the composition B1 for a hard coat layer and the film thickness of a cured hard coat layer was 5 μm.

<Measurement of Reflection Clarity>

Figure 15:
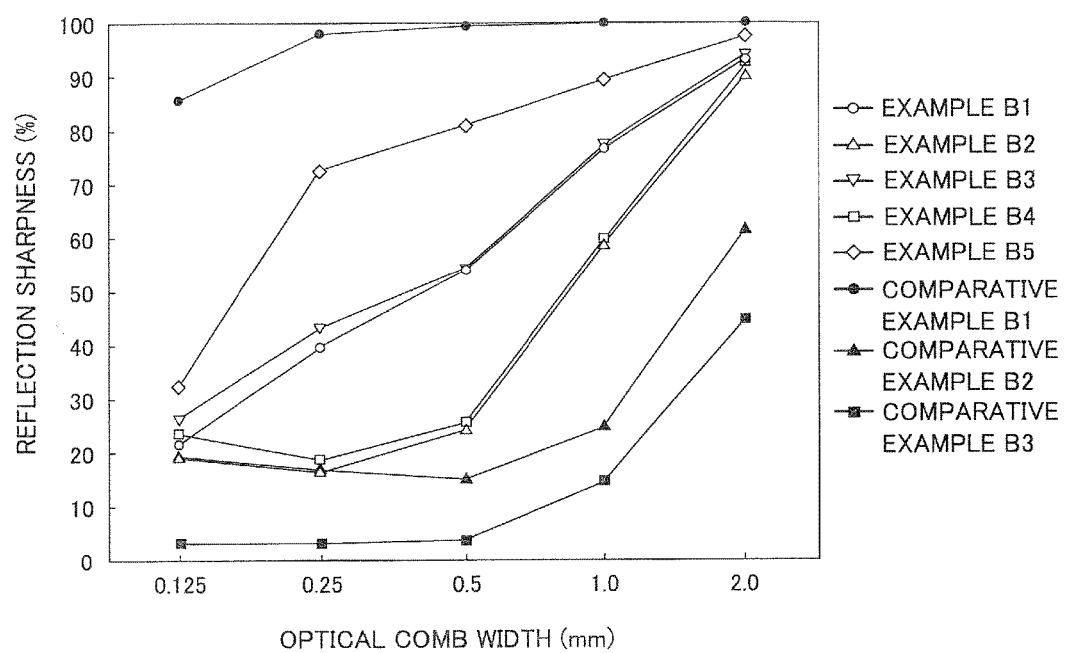
FIG. 15 is a graph representing the reflection clarities of optical sheets according to Examples B1 to B5 and Comparative Examples B1 to B3 with respect to each optical comb.

A black acrylic sheet for preventing back surface reflection was affixed through a transparent pressure sensitive adhesive to the surface opposite to the other surface, on which the hard coat layer was formed, of the triacetylcellulose resin film of each optical film obtained in Examples B1 to B5 and Comparative Examples B1 to B3, to make a sample. According to a method for measuring image clarity by the reflection method of JIS K7105, an image clarity measuring device (model number: ICM-1T, manufactured by Suga Test Instruments Co., Ltd.) was set to 45-degree reflection, the sample was put so that the hard coat layer or low refractive index layer side is directed toward the light source, and a reflection clarity was measured. Reflection clarities were measured using 0.5 mm-width and 2.0 mm-width optical combs, respectively. For reference, reflection clarities were also measured with 0.125 mm-width, 0.25 mm-width, and 1.0 mm-width optical combs. Further, the measured reflection clarities were represented in the graph (FIG. 15). The 0.25 mm-width optical comb is not defined in JIS K7105.

<Measurement of Surface Angle and Root Mean Square Slope RΔq>

A glass plate was affixed through a transparent pressure sensitive adhesive to the surface opposite to the other surface, on which the hard coat layer is formed, of each optical film obtained in Examples B1 to B5 and Comparative Examples B1 to B3, to make a sample, and the surface geometry of the optical film was measured and analyzed using a white light interference microscope (New View 6300, manufactured by Zygo Corporation) under the same conditions as those in Example A. As analysis software, Microscope Application of MetroPro ver 8.3.2 was used.

Then, a SlopeX MAP image (display of slope in x direction) was displayed to display rms with the above-described analysis software (MetroPro ver 8.3.2-Microscope Application). This rms corresponds to a root mean square slope RΔq.

A slope Δi at each point was determined over the whole surface, the slope Δi was converted into a surface angle θi from the above-described expression (3), and the rate of a region in which the absolute value of the surface angle θi was 0.05° or more was thus calculated.

<Measurement of Angle Distribution of Reflected Light Intensities>

A black acrylic sheet for preventing back surface reflection was affixed through a transparent pressure sensitive adhesive to the surface opposite to the other surface, on which the hard coat layer was formed, of the triacetylcellulose resin film of each optical film obtained in Examples B1 to B5 and Comparative Examples B1 to B3, to make a sample. The sample was put in a variable angle photometer (model number: GP-200, manufactured by MURAKAMI COLOR RESEARCH LABORATORY) so that the hard coat layer or low refractive index layer side thereof was directed toward a light source, and the angle distribution of reflected light intensities was measured under the same conditions as those in Example A.

In addition, 1/100 angle widths and ½ angle widths were determined using the obtained angle distributions of the reflection intensities, and values obtained by subtracting the ½ angle widths from the 1/100 angle widths were determined.

<Measurement of Sm, θa, Ra, Ry, and Rz>

Sm, θa, Ra, Ry, and Rz were measured on a surface (a surface of a hard coat layer in the absence of a low refractive index layer or a surface of a low refractive index layer in the presence of a low refractive index layer) of each optical film obtained in Examples B1 to B5 and Comparative Examples B1 to B3. The definitions of Sm, Ra, Ry, and Rz should comply with JIS B0601-1994, and θa should comply with the instruction manual (revised on Jul. 20, 1995) of a surface roughness measuring instrument: SE-3400, manufactured by Kosaka Laboratory Ltd.

Specifically, Sm, θa, Ra, Ry, and Rz were measured using a surface roughness measuring instrument (model number: SE-3400, manufactured by Kosaka Laboratory Ltd.) under the same measurement conditions as those in Example A.

<Interference Fringe Observation Evaluation>

A black acrylic sheet for preventing back surface reflection was affixed through a transparent pressure sensitive adhesive to the surface opposite to the other surface, on which the hard coat layer was formed, of the triacetylcellulose resin film of each optical film obtained in Examples B1 to B5 and Comparative Examples B1 to B3, each optical film was irradiated with light from a hard coat layer or low refractive index layer side, and visual observation was carried out. An interference fringe inspection lamp (sodium lamp) manufactured by Funatech Co., Ltd. was used as a light source. Generation of interference fringes was evaluated based on the following criteria:

Excellent: No interference fringe was confirmed.

Good: A few interference fringes were confirmed but were at a level without any problem.

Poor: Interference fringes were confirmed clearly.

<Cloudiness Observation Evaluation>

A black acrylic sheet was affixed through a transparent pressure sensitive adhesive to the surface opposite to the other surface, on which the hard coat layer was formed, of the triacetylcellulose resin film of each optical film obtained in Examples B1 to B5 and Comparative Examples B1 to B3, and cloudiness was observed under a table lamp (three-wavelength fluorescent lamp) in a dark room and evaluated based on the following criteria:

Good: No whiteness was observed.

Poor: Whiteness was observed.

The results are listed in Table 2 and Table 3 below.

using a 2.0 mm-width optical comb, is 80% or more was not satisfied. In contrast, as indicated in Table 2 and FIG. 15, in Examples B1 to B5, no interference fringe was confirmed or a few interference fringes were confirmed but were at a level without any problem and no cloudiness was observed since the requirement that the reflection clarity of a concavo-convex surface, measured using a 0.5 mm-width optical comb is 90% or less and the reflection clarity of a concavo-convex surface, measured using a 2.0 mm-width optical comb, is 80% or more was satisfied.

REFERENCE SIGNS LIST 10, 50, 60, 100: Optical film
11, 51, 61, 101: Light transmissive base material
11A, 51A, 61A, 101A: Mixture region
12, 52, 62, 102: Functional layer
12A, 52A, 62A, 102A: Concavo-convex surface
53, 103: Hard coat layer
54, 104: Low refractive index layer
20, 70: Polarizing plate
21: Polarizing element
30, 80: Liquid crystal panel
40, 90: Image display apparatus

TABLE 2

| | | | Reflection clarity (%) | | | | | | |
|---|---|---|---|---|---|---|---|---|---|
| | Composition for Hard Coat Layer | Low Refractive Index Layer | 0.125 mm-Width Optical Comb | 0.25 mm-Width Optical Comb | 0.5 mm-Width Optical Comb | 1.0 mm-Width Optical Comb | 2.0 mm-Width Optical Comb | Interference Fringes | Cloudiness |
| Example B1 | B1 | Absent | 21.5 | 39.6 | 54.0 | 76.5 | 93.3 | Excellent | Good |
| Example B2 | B2 | Absent | 19.0 | 16.4 | 24.1 | 58.6 | 90.2 | Excellent | Good |
| Example B3 | B1 | Present | 26.3 | 43.2 | 54.2 | 77.2 | 94.2 | Excellent | Good |
| Example B4 | B2 | Present | 23.5 | 18.6 | 25.3 | 59.6 | 92.3 | Excellent | Good |
| Example B5 | B3 | Absent | 32.4 | 72.7 | 80.9 | 89.4 | 97.2 | Good | Good |
| Comparative Example B1 | B4 | Absent | 85.6 | 98.0 | 99.4 | 99.8 | 100.0 | Poor | Good |
| Comparative Example B2 | B5 | Absent | 19.4 | 16.9 | 15.1 | 24.6 | 61.7 | Excellent | Poor |
| Comparative Example B3 | B6 | Absent | 3.2 | 3.2 | 3.7 | 14.5 | 44.9 | Excellent | Poor |

TABLE 3

| | Rate (%) of Region with Surface Angle of 0.05° or More | RΔq | 1/100 Angle Width-1/2 Angle Width (°) | Sm (mm) | θa (°) | Ra (μm) | Ry (μm) | Rz (μm) |
|---|---|---|---|---|---|---|---|---|
| Example B1 | 60.3 | 0.0024 | 0.9 | 0.270 | 0.054 | 0.049 | 0.323 | 0.257 |
| Example B2 | 65.5 | 0.0026 | 1.1 | 0.429 | 0.057 | 0.061 | 0.328 | 0.288 |
| Example B3 | 59.0 | 0.0018 | 0.9 | 0.295 | 0.052 | 0.048 | 0.286 | 0.227 |
| Example B4 | 63.2 | 0.0020 | 1.1 | 0.466 | 0.053 | 0.060 | 0.318 | 0.254 |
| Example B5 | 54.3 | 0.0020 | 0.8 | 0.222 | 0.025 | 0.039 | 0.271 | 0.208 |
| Comparative Example B1 | 1.2 | 0.0003 | 0.5 | 0.188 | 0.008 | 0.029 | 0.165 | 0.123 |
| Comparative Example B2 | 81.0 | 0.0085 | 2.8 | 0.216 | 0.205 | 0.083 | 0.649 | 0.494 |
| Comparative Example B3 | 93.9 | 0.0188 | 4.8 | 0.202 | 0.601 | 0.128 | 0.872 | 0.639 |

As indicated in Table 2 and FIG. 15, in Comparative Examples B1 to B3, either of an interference fringe or cloudiness was observed since the requirement that the reflection clarity of a concavo-convex surface, measured using a 0.5 mm-width optical comb is 90% or less and the reflection clarity of a concavo-convex surface, measured

The invention claimed is:

1. An optical film comprising: a light transmissive base material; and a functional layer disposed on the light transmissive base material, wherein:

the functional layer has a concavo-convex surface forming a surface of the optical film;

the functional layer comprises a hard coat layer having a concavo-convex surface, and a low refractive index layer conformally disposed on the concavo-convex surface of the hard coat layer and having a lower refractive index than that of the hard coat layer;

the hard coat layer comprises a binder resin and inorganic oxide fine particles having an average primary particle diameter of 1 nm or more and 100 nm or less;

the hard coat layer does not comprise any particles other than the inorganic oxide fine particles and aggregates thereof;

a root mean square slope RΔq of a roughness curve on the concavo-convex surface forming the surface of the optical film is 0.0005 or more and 0.0026 or less;

an average spacing Sm of concavities and convexities that constitute the concavo-convex surface forming the surface of the optical film is 0.20 mm or more and 0.60 mm or less;

in a state in which the concavo-convex surface forming the surface of the optical film is irradiated with parallel light travelling in a direction sloped at 10° with respect to a normal direction of the optical film, in an angle distribution of a reflected light intensity measured in a plane including both directions of the normal direction and the travelling direction of the parallel light, using a detector with a light receiving diaphragm of 4.0, a value obtained by subtracting a width of an angle region, in which a reflected light intensity that is not less than ½ of a maximum reflected light intensity is measured, from a width of an angle region, in which a reflected light intensity that is not less than 1/100 of the maximum reflected light intensity is measured, is 0.7° or more and 1.4° or less; and the detector is GP-200 manufactured by MURAKAMI COLOR RESEARCH LABORATORY.

2. The optical film according to claim 1, wherein a surface of the low refractive index layer is the concavo-convex surface forming the surface of the optical film.

3. The optical film according to claim 1, wherein the average spacing Sm is 0.22 mm or more and 0.60 mm or less.

4. The optical film according to claim 1, wherein the average spacing Sm is 0.27 mm or more and 0.60 mm or less.

5. The optical film according to claim 1, wherein an arithmetic mean roughness Ra of concavities and convexities that constitute the concavo-convex surface forming the surface of the optical film is 0.02 μm or more and 0.10 μm or less.

6. The optical film according to claim 1, wherein a maximum height roughness Ry of concavities and convexities that constitute the concavo-convex surface forming the surface of the optical film is 0.20 μm or more and 0.60 μm or less.

7. The optical film according to claim 1, wherein a ten-point average roughness Rz of concavities and convexities that constitute the concavo-convex surface forming the surface of the optical film is 0.15 μm or more and 0.50 μm or less.

8. The optical film according to claim 1, wherein an average slope angle θa of concavities and convexities that constitute the concavo-convex surface forming the surface of the optical film is 0.01° or more and 0.08° or less.

9. A polarizing plate comprising:
the optical film according to claim 1; and
a polarizing element formed on a surface of the light transmissive base material of the optical film, the surface being opposite to the other surface thereof on which the functional layer is formed.

10. A liquid-crystal display panel comprising the optical film according to claim 1.

11. An image display apparatus comprising the optical film according to claim 1.

12. An optical film comprising: a light transmissive base material; and a functional layer disposed on the light transmissive base material, wherein:

the functional layer has a concavo-convex surface forming a surface of the optical film;

the functional layer comprises a hard coat layer having a concavo-convex surface, and a low refractive index layer disposed on the concavo-convex surface of the hard coat layer and having a lower refractive index than that of the hard coat layer;

the hard coat layer comprises a binder resin and inorganic oxide fine particles having an average primary particle diameter of 1 nm or more and 100 nm or less;

the hard coat layer does not comprise any particles other than the inorganic oxide fine particles and aggregates thereof;

a root mean square slope RΔq of a roughness curve on the concavo-convex surface forming the surface of the optical film is 0.0005 or more and 0.0026 or less;

an average spacing Sm of concavities and convexities that constitute the concavo-convex surface forming the surface of the optical film is 0.20 mm or more and 0.60 mm or less;

a reflection clarity of the concavo-convex surface forming the surface of the optical film, measured using a 0.5 mm-width optical comb, is 90% or less, and a reflection clarity of the concavo-convex surface forming the surface of the optical film, measured using a 2.0 mm-width optical comb, is 80% or more; and the optical film has a transmission image clarity of 75% or more and 95% or less with a 0.125 mm-width comb and a transmission image clarity of 95% or more with a 2.0 mm-width comb.

13. The optical film according to claim 12, wherein a surface of the low refractive index layer is the concavo-convex surface forming the surface of the optical film.

14. The optical film according to claim 12, wherein the average spacing Sm is 0.22 mm or more and 0.60 mm or less.

15. The optical film according to claim 12, wherein the average spacing Sm is 0.27 mm or more and 0.60 mm or less.

16. The optical film according to claim 12, wherein an arithmetic mean roughness Ra of concavities and convexities that constitute the concavo-convex surface forming the surface of the optical film is 0.02 μm or more and 0.10 μm or less.

17. The optical film according to claim 12, wherein a maximum height roughness Ry of concavities and convexities that constitute the concavo-convex surface forming the surface of the optical film is 0.20 μm or more and 0.60 μm or less.

18. The optical film according to claim 12, wherein a ten-point average roughness Rz of concavities and convexities that constitute the concavo-convex surface forming the surface of the optical film is 0.15 μM or more and 0.50 μm or less.

19. The optical film according to claim 12, wherein an average slope angle θa of concavities and convexities that constitute the concavo-convex surface forming the surface of the optical film is 0.01° or more and 0.08° or less.

20. A polarizing plate comprising:
the optical film according to claim 12; and
a polarizing element formed on a surface of the light transmissive base material of the optical film, the surface being opposite to the other surface thereof on which the functional layer is formed.

21. A liquid-crystal display panel comprising the optical film according to claim 12.

22. An image display apparatus comprising the optical film according to claim 12.

* * * * *